United States Patent
Ueda et al.

(10) Patent No.: US 11,462,012 B2
(45) Date of Patent: Oct. 4, 2022

(54) RECORDING MEDIUM, INFORMATION PROCESSING SYSTEM, AND DISPLAY METHOD

(71) Applicant: KONAMI DIGITAL ENTERTAINMENT CO., LTD., Tokyo (JP)

(72) Inventors: Hideo Ueda, Tokyo (JP); Takahiro Yoshida, Tokyo (JP); Michio Horikiri, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 0 days.

(21) Appl. No.: 16/913,669

(22) Filed: Jun. 26, 2020

(65) Prior Publication Data
US 2020/0327328 A1 Oct. 15, 2020

Related U.S. Application Data

(63) Continuation of application No. PCT/JP2018/030204, filed on Aug. 13, 2018.

(30) Foreign Application Priority Data

Dec. 28, 2017 (JP) .............................. JP2017-254723

(51) Int. Cl.
*G06V 20/20* (2022.01)
*G06T 7/194* (2017.01)
(Continued)

(52) U.S. Cl.
CPC .............. *G06V 20/20* (2022.01); *G06T 7/194* (2017.01); *G06T 7/70* (2017.01); *A63F 13/49* (2014.09);
(Continued)

(58) Field of Classification Search
None
See application file for complete search history.

(56) References Cited

U.S. PATENT DOCUMENTS 9,155,967 B2 10/2015 Koganezawa et al.
2004/0239670 A1 12/2004 Marks
(Continued)

FOREIGN PATENT DOCUMENTS

JP 2001-195601 A 7/2001
JP 2004-145448 A 5/2004
(Continued)

OTHER PUBLICATIONS

International Search Report dated Oct. 23, 2018 for PCT/JP2018/030204.
(Continued)

*Primary Examiner* — Tapas Mazumder
(74) *Attorney, Agent, or Firm* — Sughrue Mion, PLLC

(57) ABSTRACT

A program executed by a processor causes the processor to identify, based on a result of an image captured by a first camera configured to capture an image of a user in a real space, a position of the user; display, based on the result of the image captured by the first camera, on a display, a first image representative of the user; and display, at a position that is based on an identification result obtained by identifying the position of the user, a second image that corresponds to an object in the real space.

13 Claims, 21 Drawing Sheets

(51) Int. Cl.
*G06T 7/70* (2017.01)
*A63F 13/49* (2014.01)
*A63F 13/655* (2014.01)

(52) U.S. Cl.
CPC ....... *A63F 13/655* (2014.09); *A63F 2300/695* (2013.01)

(56) References Cited

U.S. PATENT DOCUMENTS

| | | | |
|---|---|---|---|
| 2012/0206452 | A1 | 8/2012 | Geisner et al. |
| 2015/0279103 | A1 | 10/2015 | Naegle et al. |
| 2018/0005555 | A1* | 1/2018 | Funami ................... G06T 7/254 |
| 2018/0304153 | A1* | 10/2018 | Hohjoh ................. A63F 13/211 |
| 2018/0333643 | A1* | 11/2018 | Luisi ........................ A63F 13/26 |
| 2019/0384382 | A1* | 12/2019 | Hasegawa ............... G06T 15/20 |

FOREIGN PATENT DOCUMENTS

| | | |
|---|---|---|
| JP | 2014-093034 A | 5/2014 |
| JP | 2014-515130 A | 6/2014 |
| JP | 2015-170232 A | 9/2015 |
| WO | 2016/152486 A1 | 9/2016 |
| WO | 2017/068824 A1 | 4/2017 |

OTHER PUBLICATIONS

Written Opinion of the International Searching Authority dated Oct. 23, 2018 for PCT/JP2018/030204.
Office Action dated Oct. 16, 2018 for Japanese application No. 2017-254723.
Office Action dated Apr. 2, 2019 for Japanese application No. 2017-254723.
International Search Report dated Oct. 30, 2018 for PCT/JP2018/030205.
Written Opinion of the International Searching Authority dated Oct. 30, 2018 for PCT/JP2018/030205.
Office Action dated Oct. 16, 2018 for Japanese application No. 2017-254724.
Office Action dated Apr. 2, 2019 for Japanese application No. 2017-254724.
Office Action dated Aug. 20, 2019 for Japanese application No. 2017-254724.
Office Action dated Jun. 23, 2020 for Japanese application No. 2017-254724.
Communication dated Dec. 1, 2020 from the Japanese Patent Office in Application No. 2017-254724.
Office Action dated Aug. 20, 2021 from the US Patent & Trademark Office in U.S. Appl. No. 16/913,653.
Communication dated Feb. 1, 2022 from the Japanese Patent Office in Japanese Application No. 2019-209904.
Communication dated Jan. 7, 2022 from the Korean Patent Office in Korean Application No. 10-2020-7021557.
Non-Final Office Action dated Dec. 27, 2021 in U.S. Appl. No. 16/913,653.
Communication dated Jan. 7, 2022 from the Korean Patent Office in Korean Application No. 10-2020-7021555.
Advisory Action dated Mar. 1, 2022 in U.S. Appl. No. 16/913,653.
Office Action dated Apr. 5, 2022 in U.S. Appl. No. 16/913,653.
Office Action dated Aug. 23, 2022 from the Japanese Patent Office issued in Japanese Patent Application No. 2019-209904.

* cited by examiner

RECORDING MEDIUM, INFORMATION PROCESSING SYSTEM, AND DISPLAY METHOD

CROSS REFERENCE TO RELATED APPLICATIONS

This Application is a Continuation Application of PCT Application No. PCT/JP2018/030204, filed Aug. 13, 2018, which is based on, and claims priority from, Japanese Patent Application No. 2017-254723, filed Dec. 28, 2017, the entire contents of which are incorporated herein by reference.

BACKGROUND

Field of Invention

The present invention relates to information processing apparatuses, recording mediums, information processing systems, and display methods.

Description of Related Art

In recent years, techniques related to so-called Augmented Reality (AR) have become widespread, in which a composite image, obtained by combining a captured image of a real space and an image representative of virtual information, is displayed on a display. For example, Japanese Patent Application, Laid-Open Publication No. 2014-093034, discloses a technique in which an image obtained by capturing an image of an object, such as a card, provided in a real space, is combined with an image indicating a virtual character associated with the object, thereby generating a composite image as if the virtual character exists on the object, and the composite image is displayed on a display.

However, there is an object-use action such as in a game, a play, or a presentation, to be performed using an object such as a card, a piece, a figure, or the like in a real space, as in a card game, in Japanese chess (shogi), and in chess. In the following, a game will be described as an example of the object-use action. However, the present invention is also applicable to object-use actions other than in a game and is not limited to an object-use action such as in a game. Furthermore, there is a case in which an image of how a game using an object progresses is captured, and the captured image is displayed on a display, thereby showing how the game progresses to viewers other than the user who plays the game. In the case in which progress of the game is shown to the viewers, an image of the user who plays the game is captured, and this image of the user is displayed along with an image of a character or the like that corresponds to the object used by the user. Thus, a sense of reality of the game can be created for viewers.

However, in the related art, since the image that corresponds to the object is displayed without any consideration of a position of the user, it may not be possible for viewers who watch the game to sufficiently have a sense of reality of the game in some cases.

SUMMARY

The present invention has been made in view of the above-described circumstances, and one of the problems to be solved by the present invention is to provide a technique for displaying an image that corresponds to an object in consideration of a position of a user.

In order to solve the above problems, a recording medium according to one aspect of the present invention is a non-transitory computer readable recording medium having recorded therein a program executed by a processor, the program causing the processor to: identify, based on a result of an image captured by a first camera configured to capture an image of a user in a real space, a position of the user; display, based on the result of the image captured by the first camera, on a display, a first image representative of the user; and display, at a position that is based on an identification result obtained by identifying the position of the user, a second image that corresponds to an object in the real space.

An information processing apparatus according to another aspect of the present invention includes: a memory for storing instructions; and a processor that implements the instructions to: identify, based on a result of an image captured by a first camera configured to capture an image of a user in a real space, a position of the user; display, based on the result of the image captured by the first camera, on a display, a first image representative of the user; and display, at a position that is based on an identification result obtained by identifying the position of the user, a second image that corresponds to an object in the real space.

An information processing system according to another aspect of the present invention includes: a first camera configured to capture an image of a user in a real space; a display; and an information processing apparatus, in which: the information processing apparatus includes: a memory for storing instructions; and a processor that implements the instructions to: identify, based on a result of an image captured by a first camera configured to capture an image of a user in a real space, a position of the user, display, based on the result of the image captured by the first camera, on a display, a first image representative of the user, and display, at a position that is based on an identification result obtained by identifying the position of the user, a second image that corresponds to an object in the real space.

A display method according to another aspect of the present invention includes: identifying, based on a result of an image captured by a first camera configured to capture an image of a user in a real space, a position of the user; displaying, based on the result of the image captured by the first camera, on a display, a first image representative of the user; and displaying, at a position that is based on an identification result obtained by identifying the position of the user, a second image that corresponds to an object in the real space.

DESCRIPTION OF THE EMBODIMENTS

Hereinafter, modes for carrying out the present invention will be described with reference to the drawings. In each of the drawings, the dimensions and scale of each portion may appropriately differ from actual dimensions and scale. Furthermore, since the embodiments to be described below are preferred specific examples of the present invention, various types of technically preferable limits are given. However, the scope of the present invention is not limited to these modes unless otherwise specified in the following description.

1. FIRST EMBODIMENT

Figure 1:
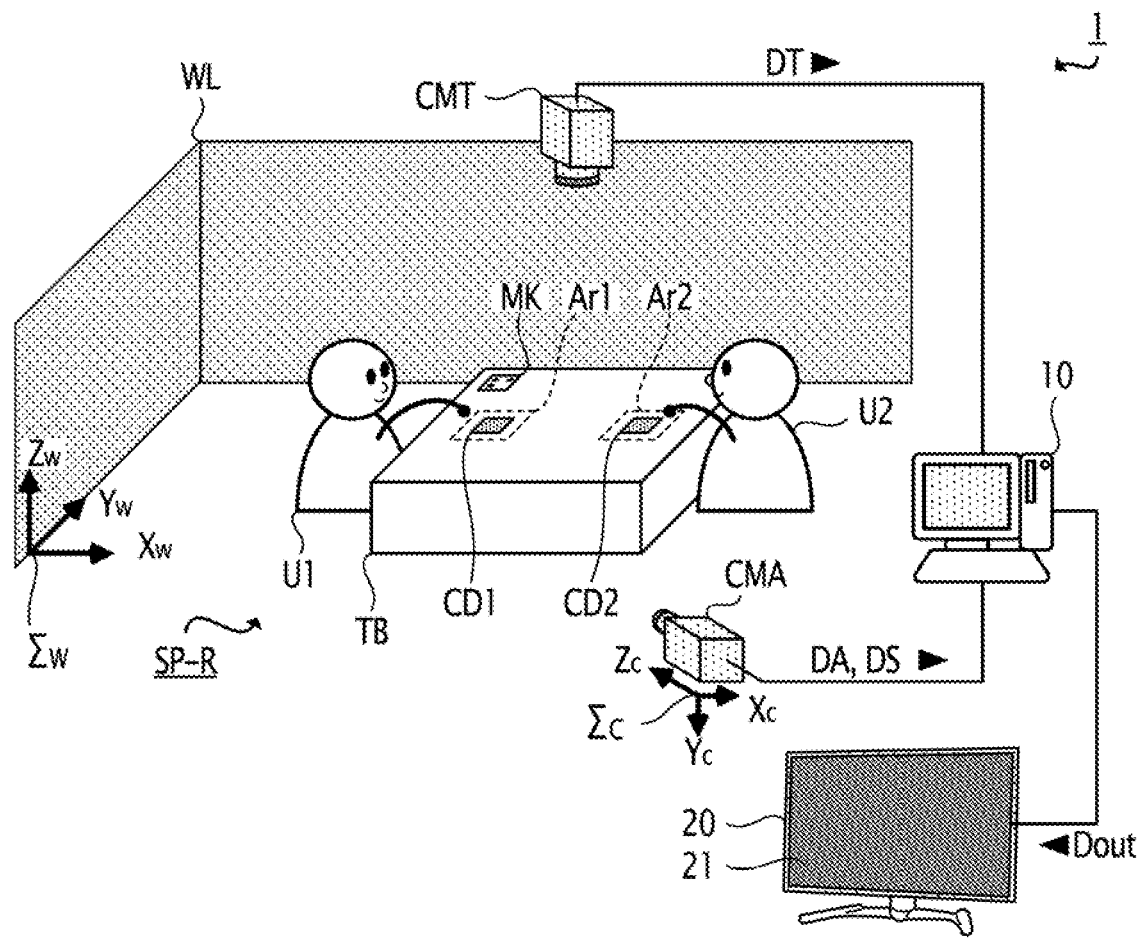
FIG. 1 is an exemplary schematic diagram of an information processing system 1 according to a first embodiment of the present invention.

Hereinafter, a first embodiment of the present invention will be described.
1.1. Outline of Information Processing System FIG. 1 is an exemplary schematic diagram of an information processing system 1 according to the embodiment. Hereinafter, an exemplary schematic diagram of the information processing system 1 will be described with reference to FIG. 1.

The information processing system 1 according to the present embodiment is configured to capture an image of a real space SP-R in which a user U1 and a user U2 who play a game exist, and to display how the user U1 and the user U2 play the game, based on the captured image. In the following description, when the user U1 and the user U2 are not distinguished, the user U1 and the user U2 are collectively referred to as a user Uq. Here, in the present embodiment, the subscript q appended to the sign represents a natural number satisfying "$1 \leq q \leq 2$". In the present embodiment, an exemplary case is assumed in which two users U1 and U2 play a game. However, the present invention is not limited to such an aspect. The game may be played by one or more users. For example, the game may be played by three users, or may be played by four users. In this case, the subscript q may be a natural number in a range according to the number of users who play the game. In other words, the subscript q may be a natural number satisfying $1 \leq q \leq 3$, may be a natural number satisfying $1 \leq q \leq 4$, or may be a natural number satisfying $1 \leq q$. In the following description, an element related to the user Uq may be expressed by appending a subscript q to a sign indicating the element.

In the present embodiment, as an example, a case is assumed in which the real space SP-R is provided with a wall WL (an example of a "background") of a room in which the user Uq exists, and a table TB on which a card CDq (example of an "object") owned by the user Uq is placed. In the present embodiment, a case is assumed in which a marker MK having a predetermined pattern is provided at a predetermined position in the real space SP-R.

In the present embodiment, as an example, a case is assumed in which the game to be played by the user U1 and the user U2 is a card game in which a card CD1 arranged on the table TB by the user U1 competes with a card CD2 arranged on the table TB by the user U2. In the card game according to the present embodiment, there are various types of cards. Each of the cards is printed with a design representing a character of a type corresponding to the type of the card. The user Uq can select a card CDq from various types of cards owned by the user Uq and arrange the selected card CDq on the table TB. Hereinafter, a character represented by the design printed on the card CDq is referred to as a character Vq.

In the card game according to the present embodiment, as an example, a case is assumed in which a hit point is assigned to the user Uq in advance, and attack power and defense power are assigned to the card CDq in advance. In the card game according to the present embodiment, as an example, when the user U1 attacks the card CD2 using the card CD1, a subtraction value obtained by subtracting the defense power of the card CD2 from the attack power of the card CD1 is subtracted from the hit point of the user U2. Similarly, in the card game according to the present embodiment, when the user U2 attacks the card CD1 using the card CD2, a subtraction value obtained by subtracting the defense power of the card CD1 from the attack power of the card CD2 is subtracted from the hit point of the user U1. In the card game according to the present embodiment, as an example, when the user U1 reduces the hit point of the user U2 to "0" or less, the user U1 wins the card game, and the user U2 loses. Similarly, in the card game according to the present embodiment, when the user U2 reduces the hit point of the user U1 to "0" or less, the user U2 wins the card game, and the user U1 loses. The games are naturally not limited to the above-described cases, and the card game is not limited to a game in which direct attack and defense between cards are performed. In other words, the game in the present invention may be any game to be played by the user Uq using an "object," such as the card CDq.

As shown in FIG. 1, the information processing system 1 includes an information processing apparatus 10, a display apparatus 20 including a display 21 configured to display an image, a storage apparatus 30 (see FIG. 4) configured to store various types of information, a camera CMA (an example of a "first camera") configured to capture an image of the real space SP-R, and a camera CMT (an example of a "second camera") configured to capture an image of an area Arq in which the card CDq is arranged in the real space SP-R.

The camera CMA captures the image of the real space SP-R and periodically outputs captured image data DA indicating an image obtained by capturing the image (hereinafter, occasionally referred to as a "captured image"). Furthermore, upon capturing an image of a subject, the camera CMA periodically outputs depth-of-field information DS indicating a value that corresponds to a distance between the camera CMA and the subject. In other words, the camera CMA captures an image of the subject in the real space SP-R, and thus outputs the captured image data DA indicating shape, pattern, and color of the subject and the depth-of-field information DS indicating the value that corresponds to the distance between the camera CMA and the subject. In the present embodiment, the depth-of-field information DS indicates, for each of the pixels constituting the captured image indicated by the captured image data DA, a value according to the distance between a site of the subject that corresponds to the pixel and the camera CMA. However, resolution of the depth-of-field information DS may be lower than resolution of the captured image data DA. For example, the depth-of-field information DS may indicate, for each of pixel blocks constituting the captured image indicated by the captured image data DA, a value that corresponds to the distance between the site of the subject corresponding to the pixel block and the camera CMA. In this case, each of the pixel blocks may be constituted by two or more pixels among the pixels constituting the captured image indicated by the captured image data DA.

In the present embodiment, a case is assumed in which the camera CMA can change a position and an orientation in the real space SP-R. In the present embodiment, for convenience of description, a world coordinate system $\Sigma_W$ fixed to the real space SP-R, and a camera coordinate system $\Sigma_C$ fixed to the camera CMA, will be introduced. Here, an example of the world coordinate system $\Sigma_W$ is a three-axis orthogonal coordinate system in which the origin is located at a predetermined position in the real space SP-R, and an $X_W$ axis, a $Y_W$ axis, and a $Z_W$ axis are orthogonal to each other. In the present embodiment, as shown in FIG. 1, an exemplary case is assumed in which a $+Z_W$ direction is a vertically upward direction. In addition, an example of the camera coordinate system $\Sigma_C$ is a three-axis orthogonal coordinate system in which the origin is located at a predetermined position on the camera CMA and an $X_C$ axis, a $Y_C$ axis, and a $Z_C$ axis are orthogonal to each other. In the present embodiment, as shown in FIG. 1, an exemplary case is assumed in which a $+Z_C$ direction is an optical axis direction of the optical system in the camera CMA. As the camera coordinate system $\Sigma_C$, a polar coordinate system may be adopted, the polar coordinate system including a coordinate axis indicating a distance from the camera CMA and a coordinate axis indicating an angle in the optical axis direction of the optical system in the camera CMA.

The camera CMT captures an image of the card CDq arranged in the area Arq on the table TB, and periodically outputs captured image data DA indicating the captured image.

The storage apparatus 30 stores card design information, character information, marker information, and relative position information. Here, the card design information is information relating to the design of the character Vq drawn on the card CDq. Furthermore, the character information indicates a three-dimensional shape of the character Vq. In the present embodiment, the marker information indicates the position and orientation of the marker MK and the shape and a size of the marker MK in the world coordinate system $\Sigma_W$. However, the marker information may indicate at least the position and orientation of the marker MK and only the shape of the marker MK in the world coordinate system $\Sigma_W$, and may not include the size of the marker MK. The relative position information will be described below.

The information processing apparatus 10 executes a display data generation process which is a process of generating display data Dout indicating an image to be displayed on the display 21. In the present embodiment, the display data generation process is a process of generating the display data Dout indicating an image to be displayed on the display 21, based on the following: the captured image data DA and the depth-of-field information DS which are output from the camera CMA; the captured image data DT which are output from the camera CMT; and information stored in the storage apparatus 30, such as the card design information, the character information, the marker information, and the relative position information storage apparatus.

Specifically, in the display data generation process, the information processing apparatus 10 identifies the type of the card CDq based on the captured image data DT and the card design information, and identifies the type of the character Vq drawn on the card CDq. In the display data generation process, the information processing apparatus 10 identifies a position $^WP_C$ and an orientation $^WR_C$ of the camera CMA in the world coordinate system $\Sigma_W$ based on the captured image data DA and the marker information (see FIG. 7). It is of note that the sign P is representative of the position, and the sign R is representative of the orientation. The superscript "W" at the left of the signs P and R means that the position and the orientation are a position and an orientation in the world coordinate system $\Sigma_W$. In addition, when the marker information does not include the size of the marker MK, the information processing apparatus 10 may specify the position $^WP_C$ and the orientation $^WR_C$ of the camera CMA in the world coordinate system $\Sigma_W$, based on the depth-of-field information DS in addition to the captured image data DA and the marker information. Furthermore, in the display data generation process, the information processing apparatus 10 identifies a position $^CP_{Uq}$ and an orientation $^CR_{Uq}$ of the user Uq in the camera coordinate system $\Sigma_C$, based on the captured image data DA and the depth-of-field information DS (see FIG. 7). The superscript "C" at the left of the signs P and R means that the position and the orientation are a position and an orientation in the camera coordinate system $\Sigma_C$. In the display data generation process, then, the information processing apparatus 10 determines a position $^CP_{Vq}$ of the character Vq in the camera coordinate system $\Sigma_C$, based on the relative position information and the position $^CP_{Uq}$ of the user Uq (see FIG. 7). Here, the relative position information indicates a vector $^WP_{UVq}$ representative of the position of the character Vq from the user Uq in the world coordinate system $\Sigma_W$, assuming that the character Vq exists in the real space SP-R (see FIG. 7). In the present embodiment, the vector $^WP_{UVq}$ is determined in advance. In other words, assuming in the present embodiment that the character Vq exists in the real space SP-R, a case is assumed in which the position of the character Vq is determined so that the user Uq and the character Vq have a "predetermined positional relationship" in the real space SP-R. In the display data generation process, the information processing apparatus 10 determines an orientation $^{C}R_{V_q}$ of the character Vq in the camera coordinate system $\Sigma_C$, based on the orientation $^{C}R_{U_q}$ of the user Uq in the camera coordinate system $\Sigma_C$ (see FIG. 7). Then, in the display data generation process, the information processing apparatus 10 determines a shape of a character image GVq indicating the character Vq on the display 21, based on the position $^{C}P_{V_q}$ and the orientation $^{C}R_{V_q}$ of the character Vq in the camera coordinate system $\Sigma_C$. Here, the shape of the character image GVq refers to a shape of the image of the character Vq captured from the camera CMA when the character Vq having a three-dimensional shape indicated by the character information exists at the position $^{C}P_{V_q}$ in the camera coordinate system $\Sigma_C$ and has the orientation $^{C}R_{V_q}$. Subsequently, in the display data generation process, the information processing apparatus 10 generates display data Dout indicating a composite image GG. This image GG is obtained by composition of the captured image indicated by the captured image data DA and a non-captured image, such as a character image GVq, which is an image other than the captured image. In the present embodiment, the information processing apparatus 10 causes the non-captured image to include a hit point image GHPq representative of the hit point of the user Uq in addition to the character image GVq.

Figure 2:
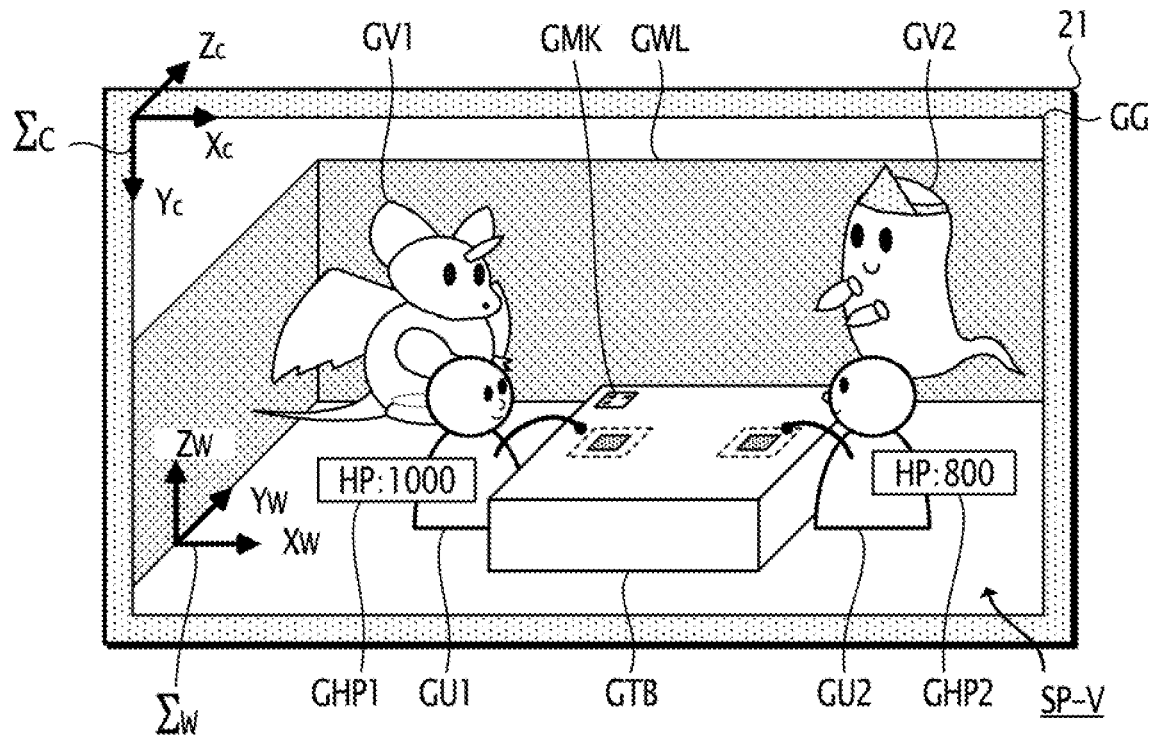
FIG. 2 is an explanatory view showing an example of a composite image GG.
Figure 3:
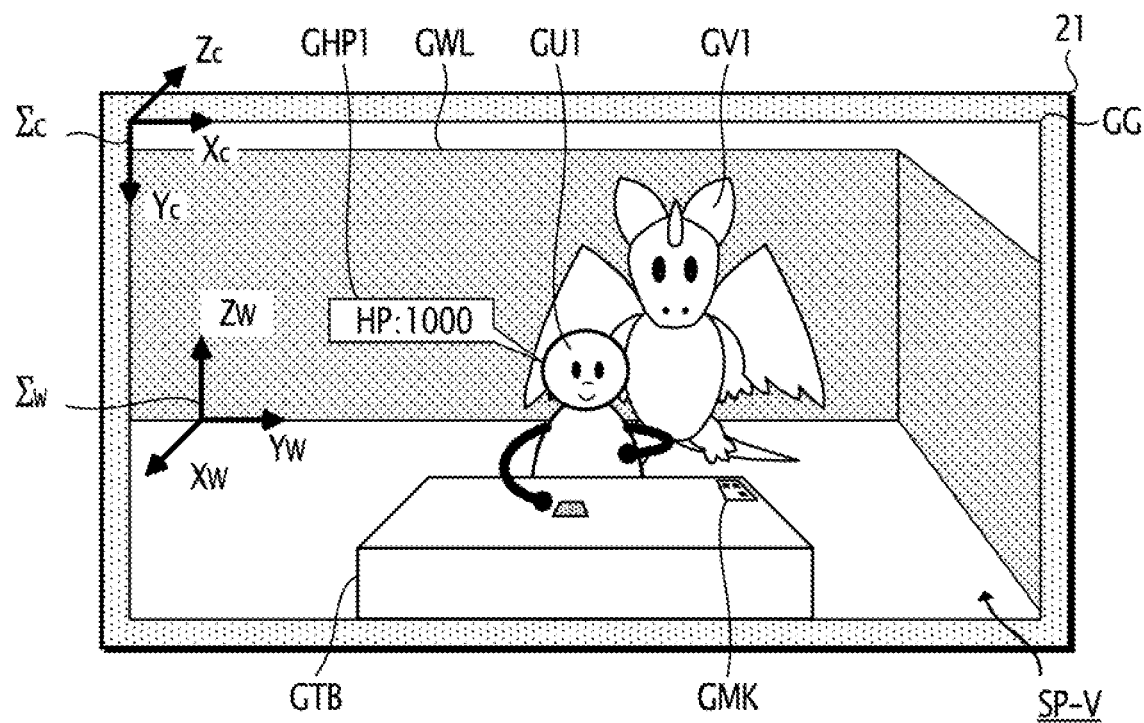
FIG. 3 is an explanatory view showing an example of the composite image GG.

FIGS. 2 and 3 show how the composite image GG based on the display data Dout is displayed on the display 21. In the drawings, FIG. 2 shows a composite image GG displayed on the display 21 when the camera CMA captures images of the user U1 and the user U2 from the $-Y_W$ side of the user U1 and the user U2 in the real space SP-R. In addition, FIG. 3 shows a composite image GG displayed on the display 21 when the camera CMA captures an image of the user U1 from the $+X_W$ side of the user U1 in the real space SP-R.

As described above, the composite image GG includes the captured image indicated by the captured image data DA and the non-captured image generated by the information processing apparatus 10. As illustrated in FIGS. 2 and 3, the captured image includes part or all of the following: a user image GUq obtained by image capturing of the user Uq; a wall image GWL obtained by image capturing of the wall WL; a table image GTB obtained by image capturing of the table TB; and a marker image GMK obtained by image capturing of the marker MK. Furthermore, the non-captured image includes part or all of the character image GVq and the hit point image GHP as described above. The user image GUq is an example of a "first image", the character image GVq is an example of a "second image", and the wall image GWL is an example of a "third image". In the present embodiment, the captured image indicates the shape, the pattern, and the color of the subject. However the present invention is not limited to such an aspect. A part of the captured image may show only a part of the shape, the contour, the color, and the pattern of the subject. For example, images other than the user image GUq in the captured image may indicate shape, pattern, and color of the subject, and the user image GUq may indicate only a shape, such as the skeleton of the user Uq, or only a contour, such as the silhouette of the user Uq. Furthermore, the user image GUq may also include an image in which all or a part of the user Uq has been subjected to processing, such as making it pixelated.

Hereinafter, a three-dimensional virtual space represented by the composite image GG will be referred to as "display space SP-V". The display space SP-V refers to a space in which a virtual object, such as a character Vq represented by the non-captured image, is added to the real space SP-R. In other words, the display space SP-V refers to a space similar to the real space SP-R except that the virtual space such as the character Vq represented by the non-captured image exists. Therefore, a position and an orientation in the display space SP-V will be represented below using the world coordinate system $\Sigma_W$ for convenience of description.

FIGS. 2 and 3 illustrate a case in which a vector $^{W}P_{UV1}$ indicated by the relative position information is directed toward the $+Y_W$ direction in the $-X_W$ direction when viewed by the user U1. For this reason, a part of the character image GV1 overlapping with the user image GU1 is not displayed on the composite image GG illustrated in FIGS. 2 and 3, and thus, a state is represented in which the user U1 is located in front of the character V1 when viewed from the camera CMA. In addition, FIG. 2 illustrates a case in which a vector $^{W}P_{UV2}$ indicated by the relative position information is directed toward the $+Y_W$ direction when viewed from the user U2. For this reason, a part of the character image GV2 overlapping with the user image GU2 is not displayed on the composite image GG illustrated in FIG. 2, and thus, a state is represented in which the user U2 is located in front of the character V2 when viewed from the camera CMA.

1.2. Configuration of Information Processing System

Figure 4:
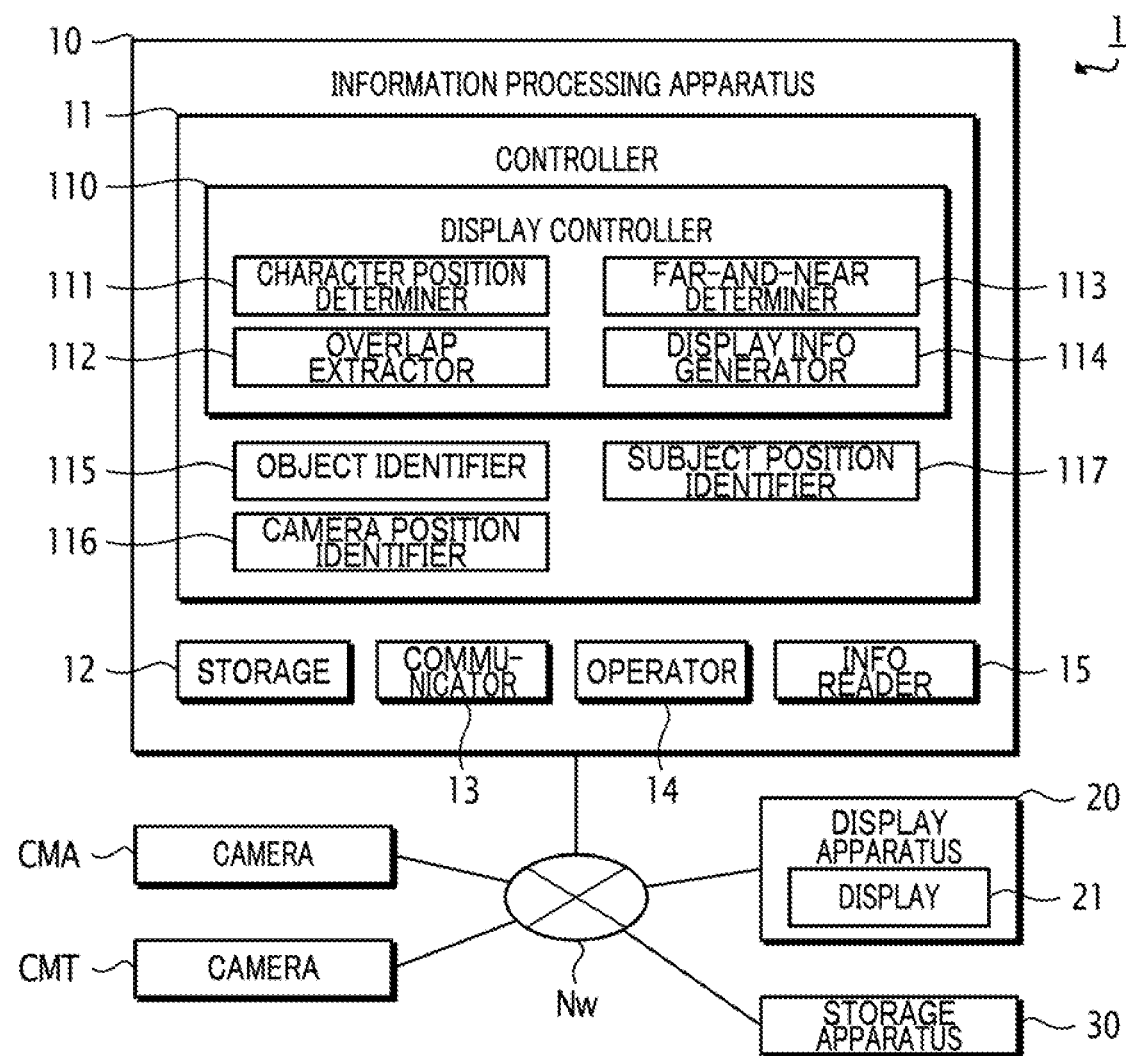
FIG. 4 is a block diagram showing an example of a configuration of the information processing system 1.
Figure 5:
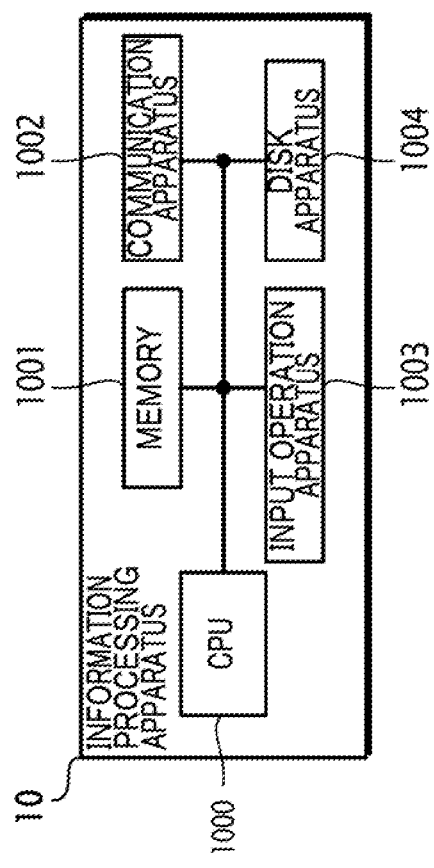
FIG. 5 is a block diagram showing a hardware configuration of an information processing apparatus 10.

Hereinafter, an example of a configuration of the information processing system 1 will be described with reference to FIGS. 4 and 5. FIG. 4 is a functional block diagram showing an example of the configuration of the information processing system 1. FIG. 5 is a configuration diagram showing an example of a hardware configuration of the information processing apparatus 10.

As illustrated in FIG. 4, the information processing system 1 includes, as described above, the information processing apparatus 10, the display apparatus 20, the storage apparatus 30, the camera CMA, the camera CMT, and a network Nw for communication among these components.

The information processing apparatus 10 includes: a controller 11 configured to control respective portions of the information processing apparatus 10; a storage 12 configured to store various types of information including a control program PRG of the information processing apparatus 10; a communicator 13 configured to execute communication with an external device of the information processing apparatus 10; an operator 14 configured to receive an operation input from an operator of the information processing apparatus 10; and an information reader 15 configured to read information from a recording medium, such as an optical disk.

The controller 11 includes a display controller 110, an object identifier 115, a camera position identifier 116, and a subject position identifier 117. In the present embodiment, subject position identifier 117 is an example of a "first identifier", and the object identifier 115 is an example of a "second identifier".

The object identifier 115 identifies the type of the character Vq drawn on the card CDq based on the captured image data DT. In other words, the object identifier 115 identifies the type of the card CDq based on the captured image data DT. The camera position identifier 116 identifies the position $^{W}P_C$ and the orientation $^{W}R_C$ of the camera CMA in the world coordinate system $\Sigma_W$, based on the marker image GMK indicated by the captured image data DA and the marker information. This makes it possible to obtain a coordinate conversion expression capable of mutually converting the position $^{C}P$ and the orientation $^{C}R$ in the camera coordinate system $\Sigma_C$ into the position $^{W}P$ and the orientation $^{W}R$ in the world coordinate system $\Sigma_W$. The subject position identifier 117 identifies the position $^{C}P_{U_q}$ and the orientation $^{C}R_{U_q}$ of the user Uq in the camera coordinate system $\Sigma_C$, based on the information corresponding to the user image GUq in the captured image data DA and the depth-of-field information DS.

The display controller 110 includes a character position determiner 111, an overlap extractor 112, a far-and-near determiner 113, and a display information generator 114.

The character position determiner 111 determines the position $^{C}P_{V_q}$ and the orientation $^{C}R_{V_q}$ of the character Vq in the camera coordinate system $\Sigma_C$, based on the vector $^{W}P_{UV_q}$ indicated by the relative position information and the position $^{C}P_{U_q}$ and the orientation $^{C}R_{U_q}$ of the user Uq in the camera coordinate system $\Sigma_C$ identified by the subject position identifier 117. The overlap extractor 112 extracts an overlap between the user image GUq and the character image GVq in the composite image GG. The far-and-near determiner 113 determines which of the user Uq and the character Vq is closer to the camera CMA, based on the position $^{C}P_{U_q}$ of the user Uq in the camera coordinate system $\Sigma_C$ and the position $^{C}P_{V_q}$ of the character Vq in the camera coordinate system $\Sigma_C$. The display information generator 114 generates the display data Dout indicating the composite image GG, based on the captured image indicated by the captured image data DA, the extraction result in the overlap extractor 112, and the determination result in the far-and-near determiner 113.

As shown in FIG. 5, the information processing apparatus 10 includes a processor 1000 configured to control the respective portions of the information processing apparatus 10, a memory 1001 configured to store therein various types of information, a communication apparatus 1002 configured to perform communication with an external device existing outside the information processing apparatus 10, an input operation apparatus 1003 configured to receive an operation input from the operator of the information processing apparatus 10, and a disk apparatus 1004 configured to read information from the recording medium.

For the memory 1001, a non-transitory recording medium may be employed. Examples of the recording medium include a volatile memory, such as a Random Access Memory (RAM) used as a work area of the processor 1000, and a non-volatile memory, such as an Electrically Erasable Programmable Read-Only Memory (EEPROM) storing various types of information of the control program PRG and the like of the information processing apparatus 10. The memory 1001 serves as the storage 12. The processor 1000 is constituted of a Central Processing Unit (CPU). The processor 1000 executes the control program PRG stored in the memory 1001, and operates according to the control program PRG. The processor 1000 serves as the controller 11. The communication apparatus 1002 is hardware configured to perform communication with the external device existing outside the information processing apparatus 10 via the network Nw. The communication apparatus 1002 serves as the communicator 13. The input operation apparatus 1003 is constituted of an operation button. The input operation apparatus 1003 serves as the operator 14 configured to receive the input operation from the operator of the information processing apparatus 10. The input operation apparatus 1003 may be configured by one or a plurality of devices including some or all of pointing devices, such as an operation button, a touch panel, a keyboard, a joystick, and a mouse. For the disk apparatus 1004, an optical disk apparatus may be employed. The disk apparatus 1004 serves as the information reader 15 configured to read various types of information of the control program PRG and the like recorded on the recording medium, such as an optical disk.

The processor 1000 may be configured to include hardware, such as a Graphics Processing Unit (GPU), a Digital Signal Processor (DSP), or a Field Programmable Gate Array (FPGA) in addition to the CPU or instead of the CPU. In this case, apart or all of the controller 11 realized by the processor 1000 may be realized by hardware, such as a DSP.

1.3. Operation of Information Processing Apparatus

Figure 6:
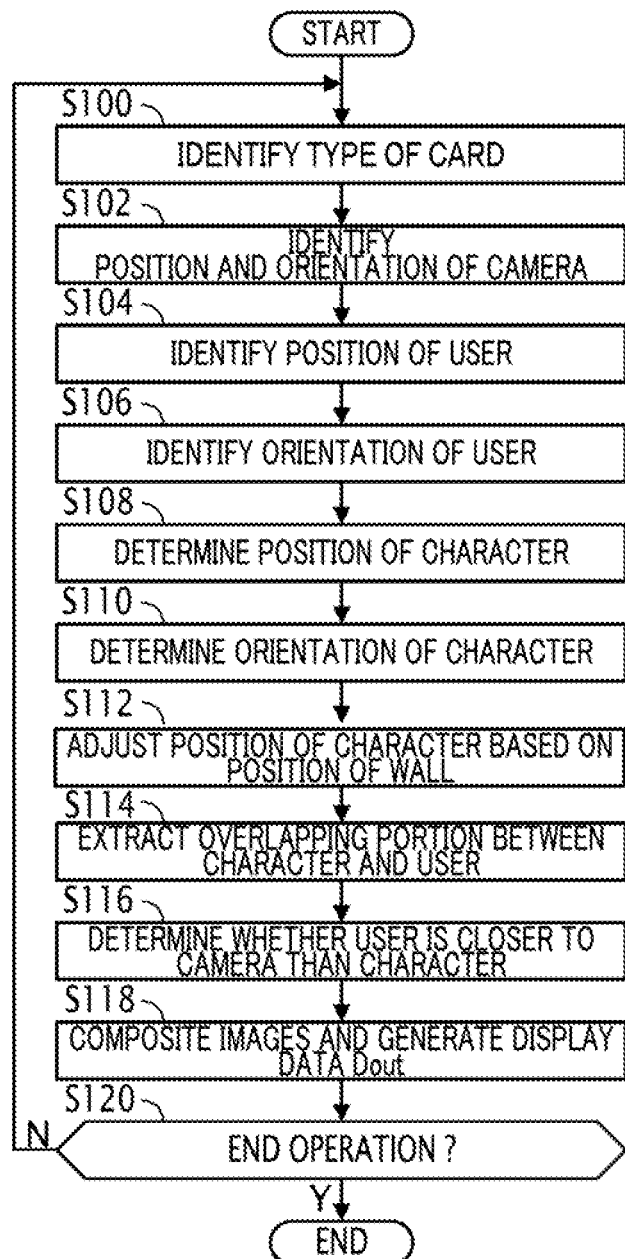
FIG. 6 is a flowchart showing an example of an operation of the information processing apparatus 10.
Figure 7:
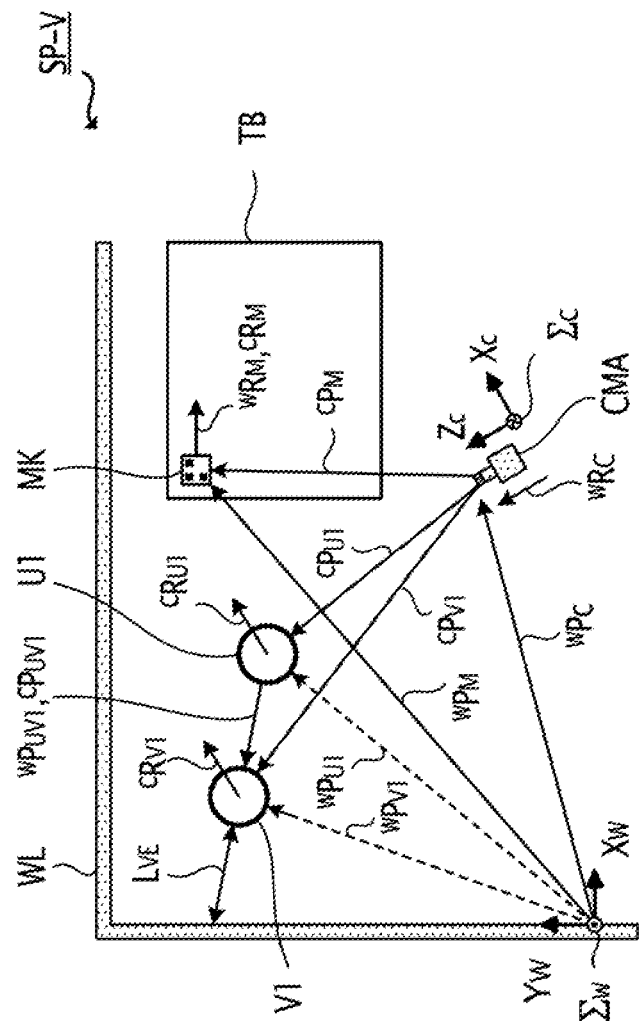
FIG. 7 is an explanatory view showing an example of an outline of a display space SP-V.

Referring to FIGS. 6 and 7, a description will be given with respect to an example of operation of the information processing apparatus 10 when the information processing apparatus 10 executes the display data generation process. FIG. 6 is a flowchart showing an example of the operation of the information processing apparatus 10 when the information processing apparatus 10 executes the display data generation process. In addition, FIG. 7 is an explanatory view illustrating positional relationships of various objects, such as the user Uq, the wall WL, the character Vq, and the camera CMA, existing in the display space SP-V when the display space SP-V is viewed from the $+Z_W$ side. In the present embodiment, an exemplary case is assumed in which the information processing apparatus 10 starts the display data generation process shown in FIG. 6 when an operation of instructing to start the display data generation process is input from the operator 14 by the operator of the information processing apparatus 10.

As shown in FIG. 6, the object identifier 115 identifies the type of the card CDq, based on the captured image data DT output from the camera CMT, in the display data generation process (S100). Specifically, at step S100, the object identifier 115, to identify the type of the card CDq, identifies the type of the character Vq drawn on the card CDq, based on the design drawn on the card CDq indicated by the captured image data DT and the design of the character Vq indicated by the card design information.

At step S100, the object identifier 115 may identify the type of card CDq based on information other than the captured image data DT. For example, when the card CDq has a wireless communication feature, the object identifier 115 may identify the type of card CDq based on the information which is received from the card CDq to identify the type of card CDq. In addition, the object identifier 115 may identify the type of the card CDq based on the captured image data DA output from the camera CMA. In this case, the object identifier 115 may identify the type of the card CDq based on the depth-of-field information DS in addition to the captured image data DA.

In the display data generation process, the camera position identifier 116 identifies the position $^{W}P_C$ and the orientation $^{W}R_C$ of the camera CMA in the world coordinate system $\Sigma_W$ based on the captured image data DA (S102). Specifically, at step S102, first, the camera position identifier 116 identifies the position $^{C}P_M$ and the orientation $^{C}R_M$ of the marker MK in the camera coordinate system $\Sigma_C$ shown in FIG. 7 based on the captured image data DA. Next, the camera position identifier 116 identifies the position $^{W}P_C$ and the orientation $^{W}R_C$ of the camera CMA in the world coordinate system $\Sigma_W$ based on the following: the position $^{C}P_M$ and the orientation $^{C}R_M$ of the marker MK in the camera coordinate system $\Sigma_C$; and the position $^{W}P_M$ and the orientation $^{W}R_M$ of the marker MK, which is indicated by the marker information, in the world coordinate system $\Sigma_W$ (see FIG. 7). At step S102, the camera position identifier 116 may identify at least one of the position $^{W}P_C$ and the orientation $^{W}R_C$ of the camera CMA in the world coordinate system $\Sigma_W$.

At step S102, the camera position identifier 116 may identify the position $^{W}P_{C}$ and the orientation $^{W}R_{C}$ of the camera CMA in the world 6 coordinate system $\Sigma_{W}$ based on information other than the captured image data DA. For example, when the camera CMT captures an image of the camera CMA, the camera position identifier 116 may identify the position $^{W}P_{C}$ and the orientation $^{W}R_{C}$ of the camera CMA in the world coordinate system $\Sigma_{W}$, based on the captured image data DT indicating the result of the image captured by the camera CMT. In addition, the camera CMA may include various sensors, such as a geomagnetic sensor, an acceleration sensor, and an angular velocity sensor. In this case, the camera position identifier 116 may identify the amount of change in the position $^{W}P_{C}$ and the orientation $^{W}R_{C}$ of the camera CMA in the world coordinate system $\Sigma_{W}$ based on outputs of various sensors. Specifically, the camera position identifier 116 may calculate a change in the position $^{W}P_{C}$ of the camera CMA in the world coordinate system $\Sigma_{W}$ based on the output of the acceleration sensor and the output of the geomagnetic sensor, and may calculate a change in the orientation $^{W}R_{C}$ of the camera CMA in the world coordinate system $\Sigma_{W}$ based on the output of the angular velocity sensor. Then, the camera position identifier 116 may be configured to identify the position $^{W}P_{C}$ and the orientation $^{W}R_{C}$ of the camera CMA in the world coordinate system $\Sigma_{W}$ at a certain time. In this case, if the camera position identifier 116 can identify the amount of change in the position $^{W}P_{C}$ and the orientation $^{W}R_{C}$ of the camera CMA in the world coordinate system $\Sigma_{W}$, the camera position identifier 116 can identify the position $^{W}P_{C}$ and the orientation $^{W}R_{C}$ of the camera CMA in the world coordinate system $\Sigma_{W}$ even after that time. Therefore, if the camera position identifier 116 is configured to identify the amount of change in the position $^{W}P_{C}$ and the orientation $^{W}R_{C}$ of the camera CMA in the world coordinate system $\Sigma_{W}$, the camera position identifier 116 can identify the position $^{W}P_{C}$ and the orientation $^{W}R_{C}$ of the camera CMA in the world coordinate system $\Sigma_{W}$ even if there is a period in which the camera CMA does not capture the image of the marker MK. Furthermore, if the camera position identifier 116 is configured to identify the amount of change in the position $^{W}P_{C}$ and the orientation $^{W}R_{C}$ of the camera CMA in the world coordinate system $\Sigma_{W}$, the camera position identifier 116 can identify the position $^{W}P_{C}$ and the orientation $^{W}R_{C}$ of the camera CMA in the world coordinate system $\Sigma_{W}$ even if there is a period in which the camera CMT does not capture the image of the camera CMA. Furthermore, the camera CMA may include a signal receiver configured to receive a position information signal output from a position information satellite, such as a GPS (Global Positioning System) satellite or a position information signal output from a signal transmitter (for example, indoor GPS) provided in the real space SP-R. In this case, the camera position identifier 116 may identify the position $^{W}P_{C}$ of the camera CMA in the world coordinate system $\Sigma_{W}$ based on the position information signal received by the signal receiver.

The subject position identifier 117 identifies, based on the captured image data DA and the depth-of-field information DS, the position $^{C}P_{Uq}$ of the user Uq in the camera coordinate system $\Sigma_{C}$ shown in FIG. 7 (S104). At step S104, the subject position identifier 117 may identify, based on the captured image data DA and the depth-of-field information DS, a position of a subject other than the user Uq among the subjects of the camera CMA. For example, the subject position identifier 117 may identify, based on the captured image data DA and the depth-of-field information DS, a position of the wall WL in the camera coordinate system $\Sigma_{C}$ at step S104.

The subject position identifier 117 identifies, based on the captured image data DA and the depth-of-field information DS, the orientation $^{C}R_{Uq}$ of the user Uq in the camera coordinate system $\Sigma_{C}$ shown in FIG. 7 (S106). At step S106, the subject position identifier 117 may identify, based on the captured image data DA and the depth-of-field information DS, a shape of the subject other than the user Uq among the subjects of the camera CMA. For example, the subject position identifier 117 may identify, based on the captured image data DA and the depth-of-field information DS, the shape of the wall WL in the camera coordinate system $\Sigma_{C}$ in step S106. As described above, when the camera CMA captures an image of the subject, the depth-of-field information DS indicates, for pixels or pixel blocks indicating a result of the captured image of the subject, a value according to the distance between a part of the subject that corresponds to the pixel or the pixel block and the camera CMA. Therefore, the subject position identifier 117 can identify, when the subject of the camera CMA includes an object, such as a wall WL, the shape of the object based on the depth-of-field information DS. The subject position identifier 117 can identify, when the subject of the camera CMA includes a person such as the user Uq, a posture of the person based on the depth-of-field information DS. Here, the posture of a person conceptually includes an orientation of the person and a position of the person.

The character position determiner 111 determines the position $^{C}P_{Vq}$ of the character Vq in the camera coordinate system $\Sigma_{C}$ shown in FIG. 7 (S108). Specifically, at step S108, the character position determiner 111 converts the vector $^{W}P_{UVq}$ indicated by the relative position information into a vector $^{C}P_{UVq}$ expressed in the camera coordinate system $\Sigma_{C}$, based on the position $^{W}P_{C}$ and the orientation $^{W}R_{C}$ of the camera CMA in the world coordinate system $\Sigma_{W}$ identified at step S102. Next, the character position determiner 111 determines the position $^{C}P_{Vq}$ of the character Vq in the camera coordinate system $\Sigma_{C}$ based on the vector $^{C}P_{UVq}$ and the position $^{C}P_{Uq}$ of the user Uq identified at step S104. The character position determiner 111 may determine the position $^{C}P_{Vq}$ of the character Vq in the camera coordinate system $\Sigma_{C}$ as follows at step S108. In other words, at step S108, first, the character position determiner 111 converts, based on the position $^{W}P_{C}$ and the orientation $^{W}R_{C}$ of the camera CMA in the world coordinate system $\Sigma_{W}$ identified at step S102, the position $^{C}P_{Uq}$ of the user Uq in the camera coordinate system $\Sigma_{C}$ identified at step S104 into the position $^{W}P_{Uq}$ expressed in the world coordinate system $\Sigma_{W}$. Next, the character position determiner 111 determines a position $^{W}P_{Vq}$ of the character Vq in the world coordinate system $\Sigma_{W}$, based on the position $^{W}P_{Uq}$ of the user Uq in the world coordinate system $\Sigma_{W}$ and the vector $^{W}P_{UVq}$ in the world coordinate system $\Sigma_{W}$ indicated by the relative position information. Thereafter, the character position determiner 111 converts the position $^{W}P_{Vq}$ of the character Vq in the world coordinate system $\Sigma_{W}$ into the position $^{C}P_{Vq}$ expressed in the camera coordinate system $\Sigma_{C}$.

The character position determiner 111 determines the orientation $^{C}R_{Vq}$ of the character Vq in the camera coordinate system $\Sigma_{C}$ shown in FIG. 7 (S110). Specifically, the character position determiner 111 determines the orientation $^{C}R_{Vq}$ of the character Vq at step S110 such that the orientation $^{C}R_{Vq}$ of the character Vq in the camera coordinate system $\Sigma_{C}$ coincides with the orientation $^{C}R_{Uq}$ of the user Uq identified at step S106. However, the character position determiner 111 may determine the orientation $^C R_{V_q}$ of the character Vq in step S110 such that the orientation $^C R_{V_q}$ of the character Vq in the camera coordinate system $\Sigma_C$ and the orientation $^C R_{U_q}$ of the user Uq in the camera coordinate system $\Sigma_C$ so as to be equal to or less than a predetermined angle.

The character position determiner 111 adjusts the position $^C P_{V_q}$ of the character Vq based on the relative positional relationships between the character Vq and the wall WL in the display space SP-V (S112). Specifically, at step S112, the character position determiner 111 determines whether the following condition (hereinafter, occasionally referred to as "character position condition") is satisfied. The condition is that a distance LVE between the character Vq and the wall WL on an extension line of the vector $^C P_{UV_q}$ is equal to or greater than a predetermined distance, and the character Vq is located in front of the wall WL when viewed from the user Uq. Then, if the result of the determination is affirmative, the character position determiner 111 maintains the position $^C P_{V_q}$ of the character Vq. On the other hand, if the result of the determination is negative, the character position determiner 111 adjusts the position $^C P_{V_q}$ of the character Vq by moving the character Vq in a direction opposite to the vector $^C P_{UV_q}$ until the character position condition is satisfied.

The overlap extractor 112 extracts an overlap portion between the user image GUq representative of the user Uq and the character image GVq representative of the character Vq (S114). Specifically, at step S114, the overlap extractor 112 arranges, based on the captured image data DA, the user image GUq representative of the user Uq in the composite image GG. In addition, the overlap extractor 112 arranges, based on the position $^C P_{V_q}$ and the orientation $^C R_{V_q}$ of the character Vq in the camera coordinate system $\Sigma_C$ and the three-dimensional shape of the character Vq indicated by the character information, the character image GVq representative of the character Vq in the composite image GG. Then, the overlap extractor 112 extracts an overlap portion between the user image GUq and the character image GVq arranged in the composite image GG.

The far-and-near determiner 113 determines, based on the position $^C P_{U_q}$ of the user Uq in the camera coordinate system $\Sigma_C$ and the position $^C P_{V_q}$ of the character Vq in the camera coordinate system $\Sigma_C$, whether the user Uq is closer to the camera CMA than the character Vq (S116).

The display information generator 114 makes the captured image indicated by the captured image data DA and the non-captured image, such as the character image GVq, composite according to the results of steps S114 and S116, thereby generating the display data Dout indicating the composite image GG (S118). Specifically, if the result of the determination at step S116 is affirmative, the display information generator 114 does not display the overlap portion of the character image GVq extracted at step S114, and then causes the character image GVq and the hit point image GHP to be displayed on the captured image, thereby generating a composite image GG at step S118. On the other hand, if the result of the determination at step S116 is negative, the display information generator 114 causes the character image GVq and the hit point image GHP to be displayed on the captured image, thereby generating a composite image GG at step S118. In this case, the user image GUq is displayed on the composite image GG in a state in which the overlap portion of the user image GUq extracted at step S114 is hidden.

The display information generator 114 determines whether an operation of instructing to end the display data generation process is input from the operator 14 by the operator of the information processing apparatus 10 (S120). Then, if the result of the determination at step S120 is affirmative, the display information generator 114 ends the display data generation process shown in FIG. 6. On the other hand, if the result of the determination in step S120 is negative, the display information generator 114 proceeds with the process to step S100.

1.4. Summary of First Embodiment

As described above, according to the present embodiment, the character Vq is arranged at a position determined by the vector $^C P_{UV_q}$ in the display space SP-V indicated by the composite image GG as viewed from the user Uq. Therefore, according to the present embodiment, the user image GUq representative of the user Uq and the user image GUq representative of the character Vq can be displayed in association with each other. Thus, according to the present embodiment, when the information processing system 1 causes the display 21 to display how the user U1 and the user U2 are playing the card game, a sense of reality of the card game can be created in the composite image GG displayed on the display 21.

Furthermore, according to the present embodiment, the display position of the character image GVq representative of the character Vq in the composite image GG is determined based on the following: the identification result of the position $^W P_C$ and the orientation $^W R_C$ of the camera CMA in the world coordinate system $\Sigma_W$ identified by the camera position identifier 116; and identification result of the position $^C P_{U_q}$ and the orientation $^C R_{U_q}$ of the user Uq in the camera coordinate system $\Sigma_C$ identified by the subject position identifier 117. In other words, according to the present embodiment, the display position of the character image GVq representative of the character Vq in the composite image GG is determined regardless of the arrangement position and orientation of the card CDq. For this reason, according to the present embodiment, the display position of the character image GVq in the composite image GG can be easily adjusted compared with a case in which the display position of the character image GVq representative of the character Vq is affected by the arrangement position and orientation of the card CDq.

According to the present embodiment, the display position and the shape of the character image GVq in the composite image GG are determined regardless of the arrangement position and the orientation of the card CDq. For this reason, according to the present embodiment, time and effort for the arrangement of the card CDq by the user Uq can be reduced compared with a case in which the display position and the shape of the character image GVq in the composite image GG are determined based on the arrangement position and the orientation of the card CDq.

Furthermore, according to the present embodiment, them is no need to print a marker for identifying the orientation of the card CDq on the card CDq. Therefore, according to the present embodiment, the degree of freedom in the design of the card CDq can be improved compared with a case in which the display position and the display shape of the character image GVq in the composite image GG are determined based on the arrangement position and the orientation of the card CDq.

2. SECOND EMBODIMENT

Hereinafter, a second embodiment of the present invention will be described. In each of embodiments exemplified below, elements having the same operational actions and functions as those of the first embodiment will be denoted by the same reference signs used in the description of the first embodiment, and detailed description thereof will not be presented, as appropriate.

The second embodiment is different from the first embodiment in that: the position and the orientation of the user Uq in the world coordinate system $\Sigma_W$ are determined in advance; and the position and the orientation of the character Vq in the world coordinate system $\Sigma_W$ are determined in advance.

Figure 8:
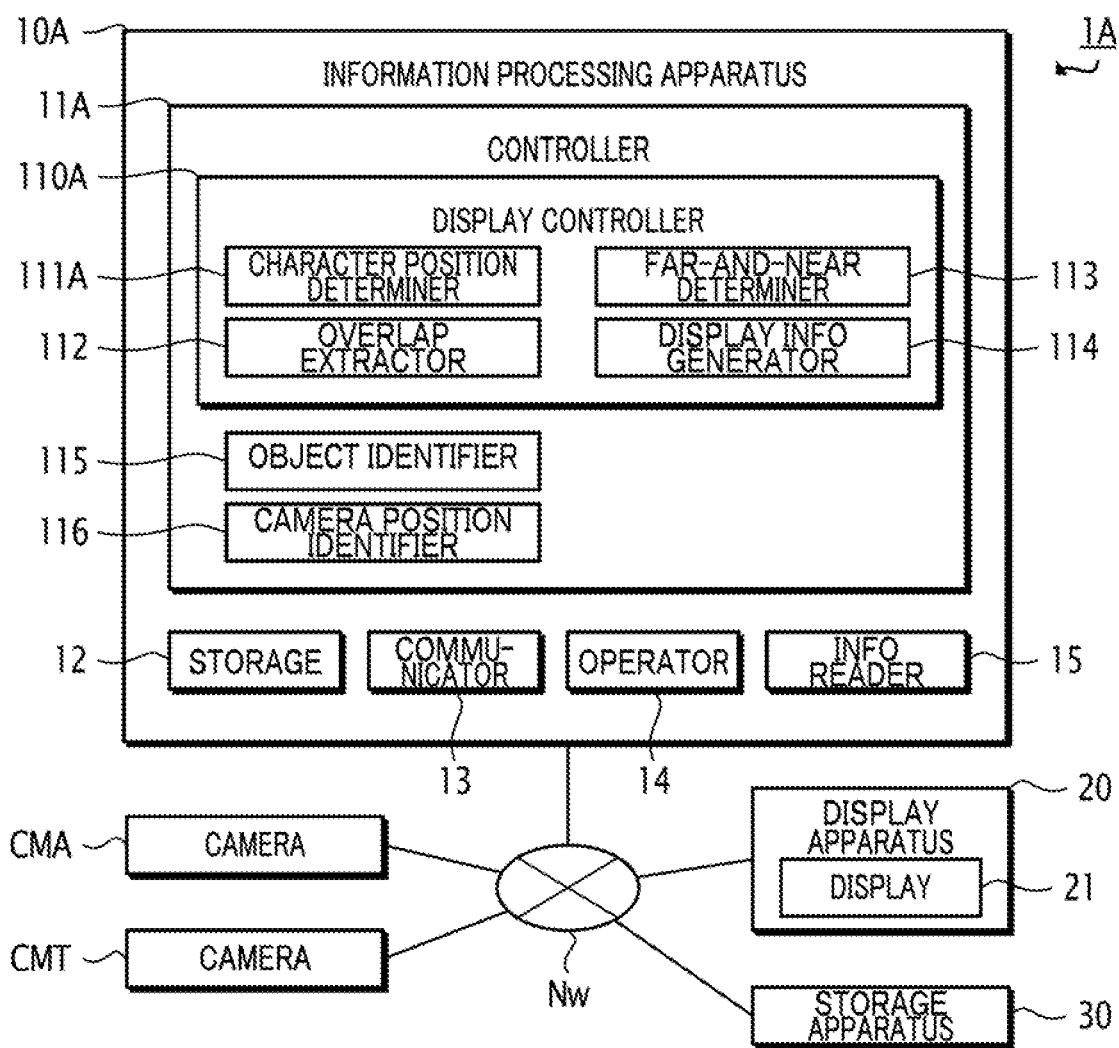
FIG. 8 is an exemplary block diagram showing a configuration of an information processing system 1A according to a second embodiment of the present invention.

FIG. 8 is an exemplary functional block diagram showing a configuration of an information processing system 1A according to the second embodiment. The information processing system 1A is configured in the same manner as the information processing system 1 according to the first embodiment shown in FIG. 4, except for including an information processing apparatus 10A having a controller 11A instead of the information processing apparatus 10 having the controller 11. The controller 11A is configured in the same manner as the controller 11 according to the first embodiment shown in FIG. 4 except for including a display controller 110A having a character position determiner 111A instead of the display controller 110 having the character position determiner 111 and not including the subject position identifier 117.

Figure 10:
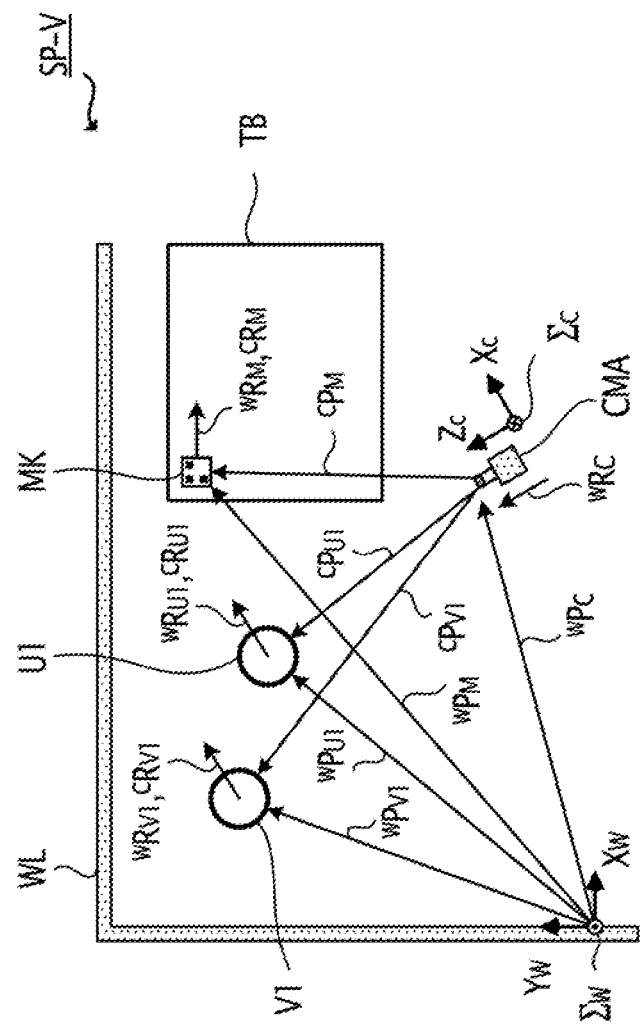
FIG. 10 is an explanatory view showing an example of an outline of a display space SP-V.

In the present embodiment, the storage apparatus 30 stores therein the following information: user position information indicating the position $^{W}P_{Uq}$; and the orientation $^{W}R_{Uq}$ of the user Uq in the world coordinate system $\Sigma_W$; and character position information indicating the position $^{W}P_{Vq}$ and the orientation $^{W}R_{Vq}$ of the character Vq in the world coordinate system $\Sigma_W$ in addition to the card design information, the character information, and the marker information (see FIG. 10). Here, the user position information may indicate a position and an orientation of a seat on which the user Uq sits in the world coordinate system $\Sigma_W$. Furthermore, the character position information may indicate a position behind or above a seat on which the user Uq sits and an orientation of the seat in the world coordinate system $\Sigma_W$. In the present embodiment, the storage apparatus 30 may not store therein the relative position information. In the present embodiment, the camera CMA may output at least the captured image data DA, and may not output the depth-of-field information DS.

Figure 9:
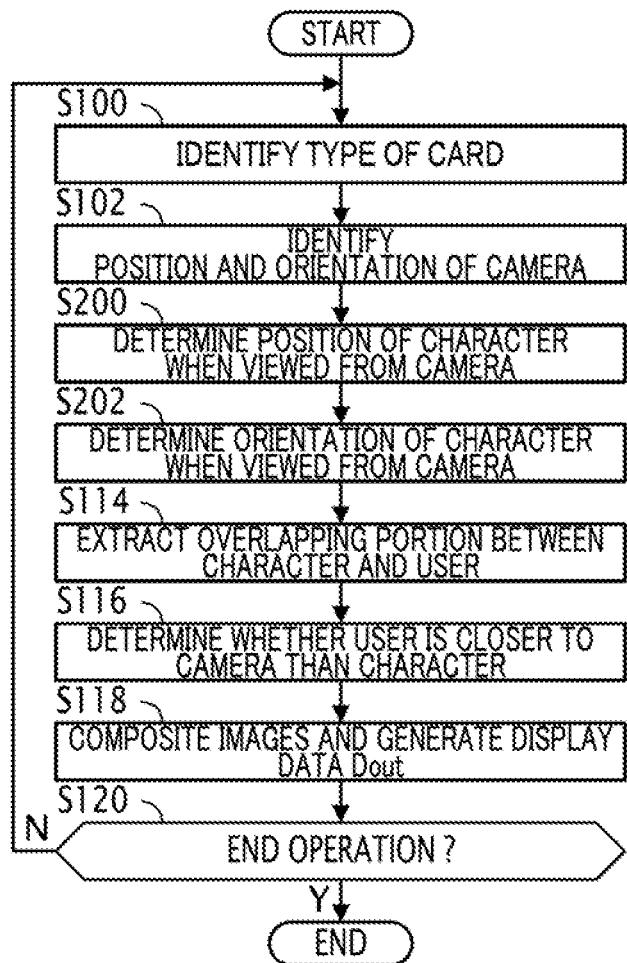
FIG. 9 is an exemplary flowchart showing an operation of an information processing apparatus 10A.

Referring to FIGS. 9 and 10, description will be given with respect to an example of an operation of the information processing apparatus 10A when the information processing apparatus 10A executes a display data generation process of generating display data Dout. FIG. 9 is an exemplary flowchart showing the operation of the information processing apparatus 10A when the information processing apparatus 10A executes the display data generation process. In addition, FIG. 10 is an explanatory view illustrating a positional relationship between various objects when the display space SP-V is viewed from the $+Z_W$ side.

As shown in FIG. 9, the display data generation process according to the present embodiment is the same process as the display data generation process according to the first embodiment shown in FIG. 6, except that steps S104, S106, and S112 are not executed, and steps S200 and S202 are executed instead of steps S108 and S110.

As shown in FIG. 9, when the display data generation process is started, the object identifier 115 identifies the type of card CDq (S100). Next, the camera position identifier 116 identifies the position $^{W}P_C$ and the orientation $^{W}R_C$ of the camera CMA in the world coordinate system $\Sigma_W$ (S102). Then, as shown in FIG. 10, the character position determiner 111A identifies the position $^{C}P_{Vq}$ of the character Vq in the camera coordinate system $\Sigma_C$, based on the following: the position $^{W}P_{Vq}$ of the character Vq in the world coordinate system $\Sigma_W$ as indicated by the character position information; and the position $^{W}P_C$ and the orientation $^{W}R_C$ of the camera CMA in the world coordinate system $\Sigma_W$ (S200). Furthermore, as shown in FIG. 10, the character position determiner 111A identifies the orientation $^{C}R_{Vq}$ of the character Vq in the camera coordinate system $\Sigma_C$, based on the following: the orientation $^{W}R_{Vq}$ of the character Vq in the world coordinate system $\Sigma_W$ as indicated by the character position information; and the position $^{W}P_C$ and the orientation $^{W}R_C$ of the camera CMA in the world coordinate system $\Sigma_W$ (S202). Thereafter, the overlap extractor 112 extracts an overlap portion between the user image GUq and the character image GVq (S14). Then, the far-and-near determiner 113 determines which of the user Uq and the character Vq is closer to the camera CMA (S116). Next, the display information generator 114 generates display data Dout indicating the composite image GG (S118). Thereafter, the display information generator 114 determines the end of the display data generation process (S120).

As described above, according to the present embodiment, the position $^{C}P_{Vq}$ and the orientation $^{C}R_{Vq}$ of the character Vq in the camera coordinate system $\Sigma_C$ are identified based on the position $^{W}P_C$ and the orientation $^{W}R_C$ of the camera CMA in the world coordinate system $\Sigma_W$. Therefore, according to the present embodiment, the character Vq and the user Uq can be displayed in association with each other regardless of the position or the orientation of the camera CMA.

3. THIRD EMBODIMENT

A third embodiment of the present invention will be described below. The third embodiment is different from the second embodiment in that the type of the character Vq represented by the character image GVq is designated without using the captured image data DT output from the camera CMT.

Figure 11:
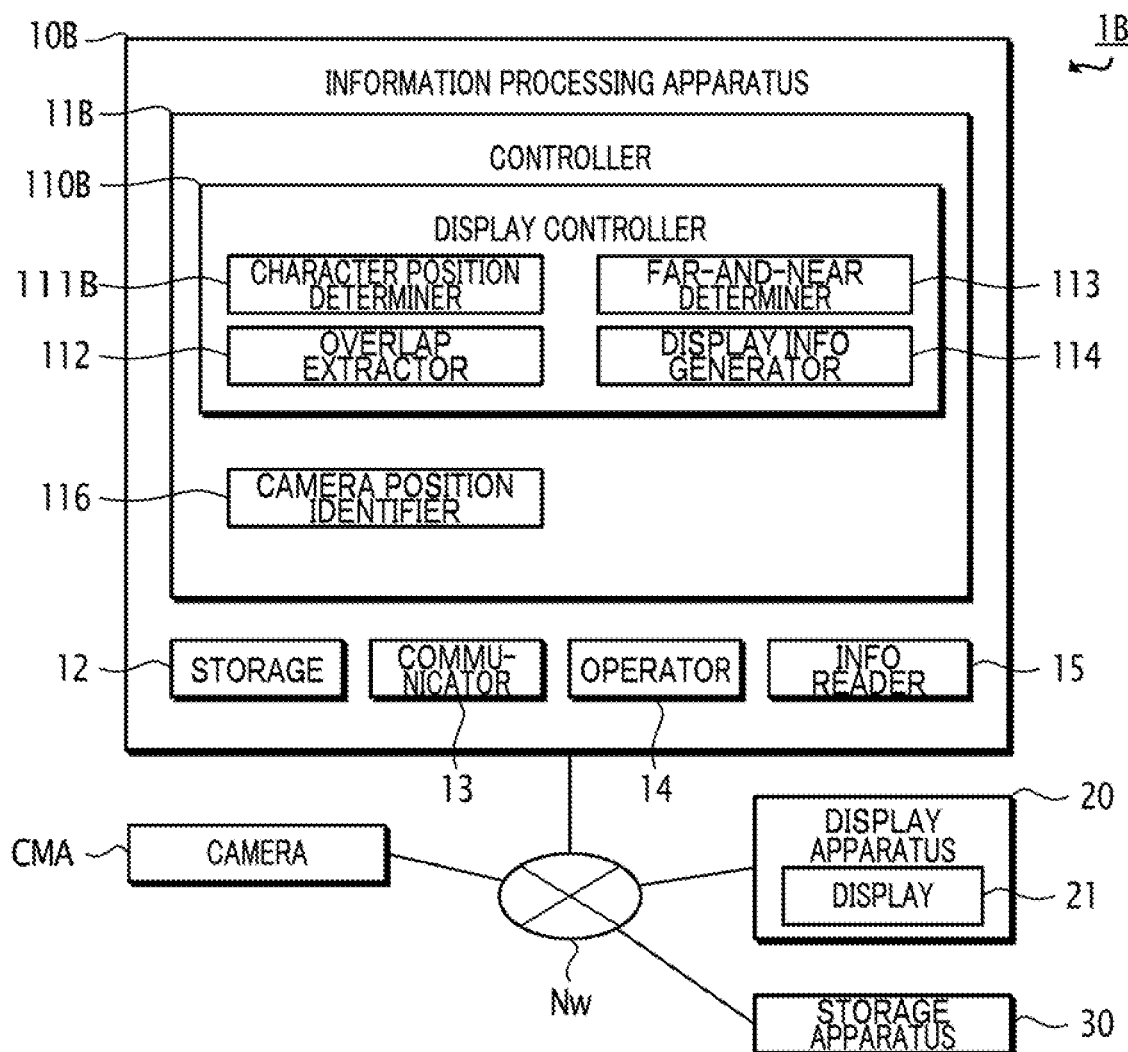
FIG. 11 is an exemplary block diagram showing a configuration of an information processing system 1B according to a third embodiment of the present invention.

FIG. 11 is an exemplary functional block diagram showing a configuration of an information processing system 1B according to the third embodiment. The information processing system 1B is configured in the same manner as the information processing system 1A according to the second embodiment shown in FIG. 8 except for including an information processing apparatus 10B having a controller 11B instead of the information processing apparatus 10A having the controller 11A and not including the camera CMT. The controller 11B is configured in the same manner as the controller 11A according to the second embodiment shown in FIG. 8 except for including a display controller 110B having a character position determiner 111B instead of the display controller 110A having the character position determiner 111A and not including the object identifier 115. In the present embodiment, the storage apparatus 30 stores therein character information, marker information, user position information, and character position information. In other words, in the present embodiment, the storage apparatus 30 may not store card design information and relative position information. In the present embodiment, the camera CMA may output at least the captured image data DA, and may not output the depth-of-field information DS.

Figure 12:
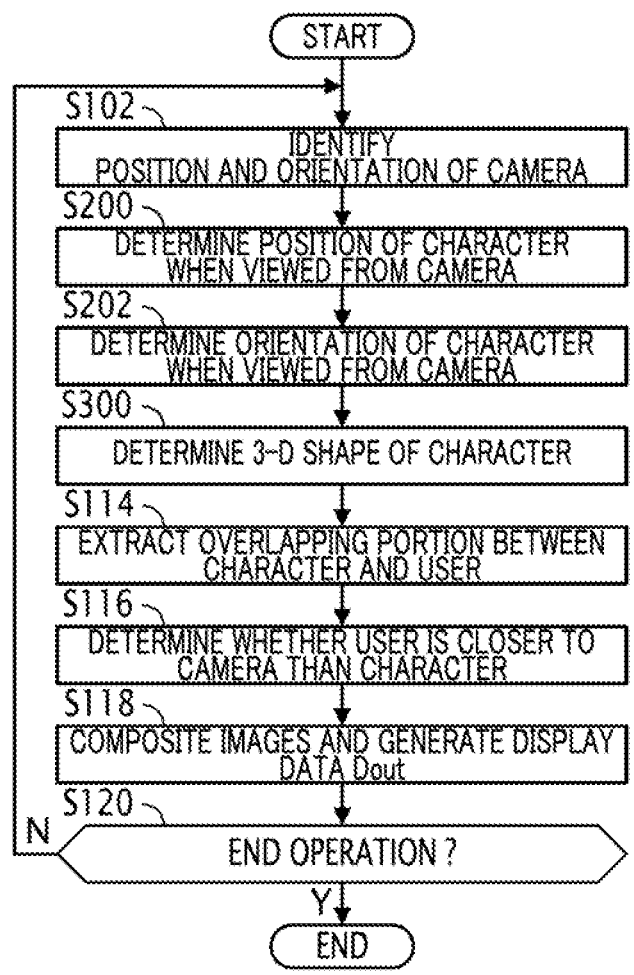
FIG. 12 is an exemplary flowchart showing an operation of an information processing apparatus 10B.

FIG. 12 is an exemplary flowchart showing an operation of the information processing apparatus 10B when the information processing apparatus 10B executes the display data generation process of generating display data Dout. As shown in FIG. 12, the display data generation process according to the present embodiment is the same process as the display data generation process according to the second embodiment shown in FIG. 9, except that the process of step S100 is not executed and a process of step S300 is executed.

As shown in FIG. 12, when the display data generation process is started, the camera position identifier 116 identifies the position $^{W}P_{C}$ and the orientation $^{W}R_{C}$ of the camera CMA in the world coordinate system $\Sigma_{W}$ (S102). Next, the character position determiner 111B identifies the position $^{C}P_{Vq}$ of the character Vq in the camera coordinate system $\Sigma_{C}$ (S200). Then, the character position determiner 111B identifies the orientation $^{C}R_{Vq}$ of the character Vq in the camera coordinate system $\Sigma_{C}$ (S202). Thereafter, the character position determiner 111B determines the type of the character Vq, and determines the three-dimensional shape of the character Vq based on the character information corresponding to the determined type of the character Vq (S300). At step S300, the character position determiner 111B may determine the type of the character Vq based on information, such as information input using the operator 14 by the operator of the information processing apparatus 10B. Alternatively, the type of the character Vq determined by the character position determiner 111B at step S300 may be stored in the storage apparatus 30 in advance. Thereafter, the overlap extractor 112 extracts an overlap portion between the user image GUq and the character image GVq (S114). Next, the far-and-near determiner portion 113 determines which of the user Uq and the character Vq is closer to the camera CMA (S116). Then, the display information generator 114 generates display data Dout indicating the composite image GG (S118). Thereafter, the display information generator 114 determines the end of the display data generation process (S120).

As described above, according to the present embodiment, the position $^{C}P_{Vq}$ and the orientation $^{C}R_{Vq}$ of the character Vq in the camera coordinate system $\Sigma_{C}$ are identified based on the position $^{W}P_{C}$ and the orientation $^{W}R_{C}$ of the camera CMA in the world coordinate system $\Sigma_{W}$. Therefore, according to the present embodiment, the character Vq and the user Uq can be displayed in association with each other, regardless of the position or the orientation of the camera CMA.

4. FOURTH EMBODIMENT

A fourth embodiment of the present invention will be described below.

The fourth embodiment is different from the first embodiment in that the display position of the character image GVq in the composite image GG is determined without identifying the position $^{W}P_{C}$ and the orientation $^{W}R_{C}$ of the camera CMA in the world coordinate system $\Sigma_{W}$.

Figure 13:
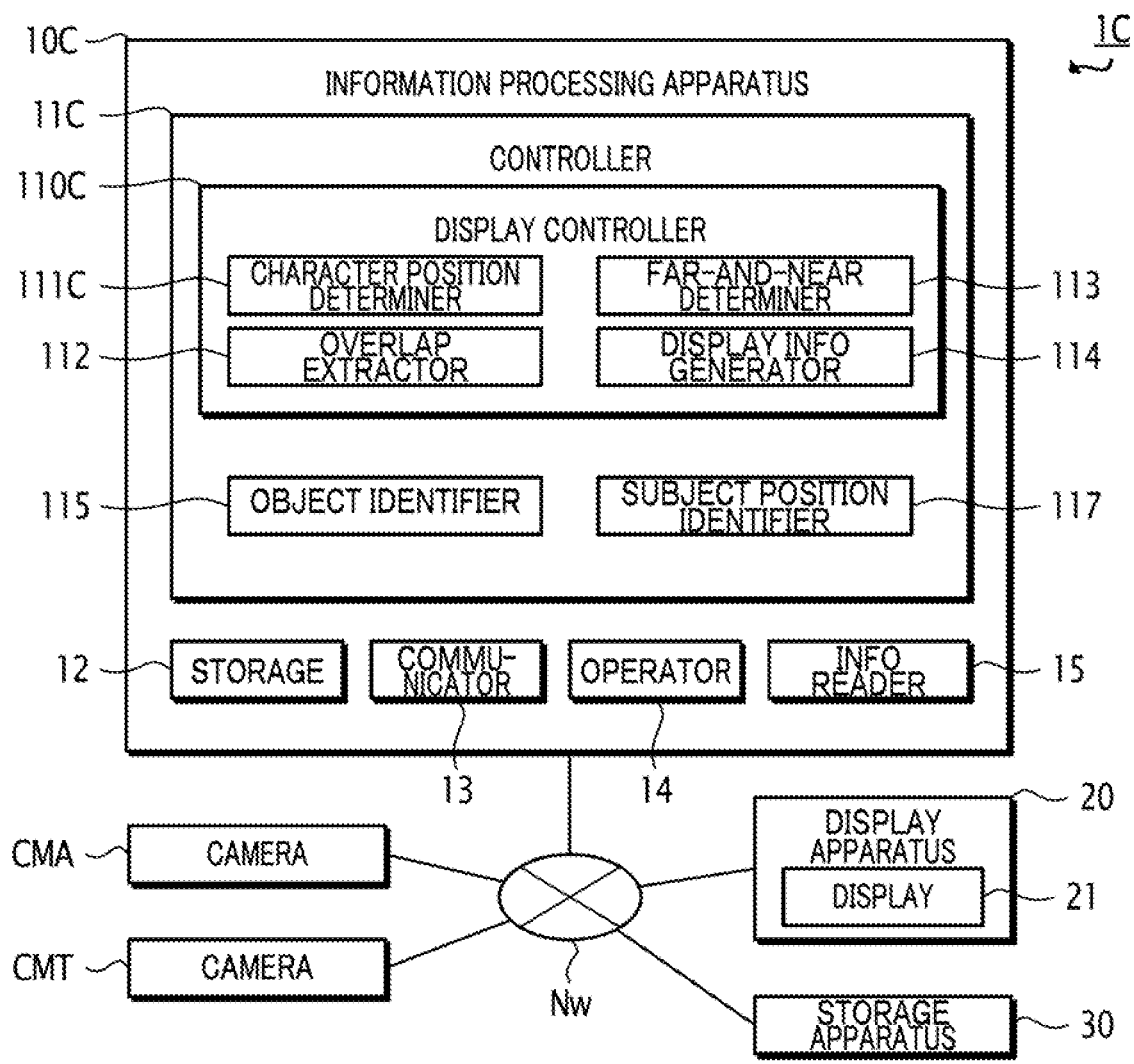
FIG. 13 is an exemplary block diagram showing a configuration of an information processing system 1C according to a fourth embodiment of the present invention.

FIG. 13 is an exemplary functional block diagram showing a configuration of an information processing system 1C according to the fourth embodiment. The information processing system 1C is configured in the same manner as the information processing system 1 according to the first embodiment shown in FIG. 4, except for including an information processing apparatus 10C having a controller 11C instead of the information processing apparatus 10 having the controller 11. The controller 11C is configured in the same manner as the controller 11 according to the first embodiment shown in FIG. 4, except for including a display controller 110C having a character position determiner 111C instead of the display controller 110 having the character position determiner 111 and not including the camera position identifier 116.

In the present embodiment, the storage apparatus 30 stores card design information and character information. In other words, in the present embodiment, the storage apparatus 30 may not store therein marker information and relative position information. In the present embodiment, the marker MK may not be provided in the real space SP-R.

Figure 14:
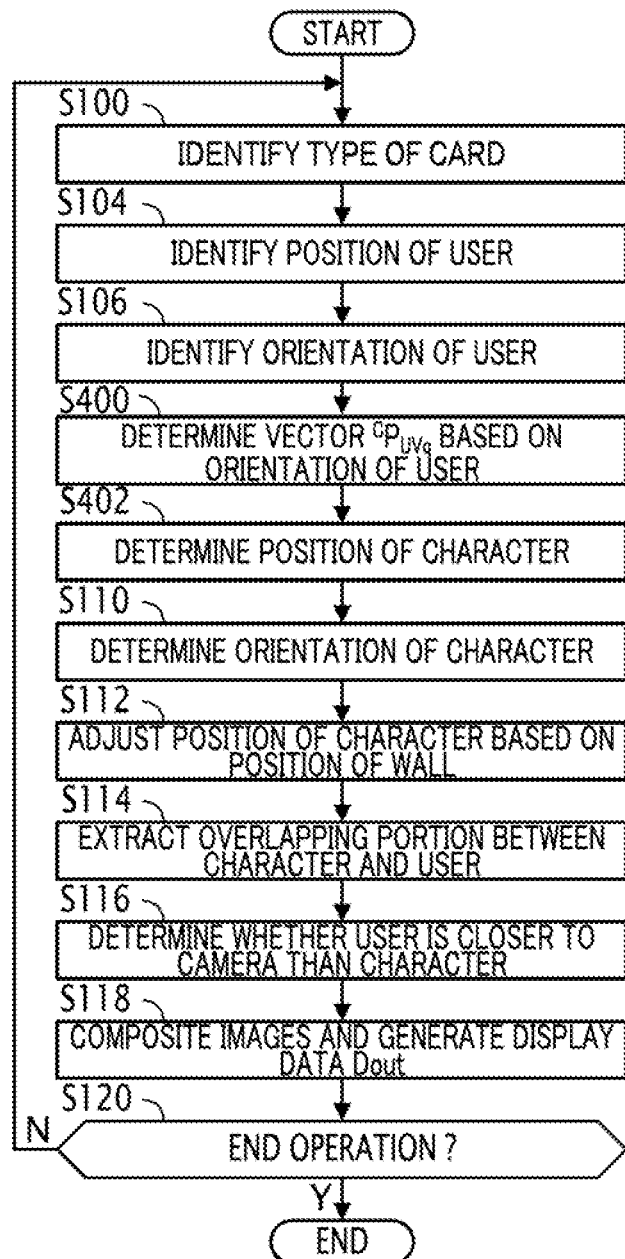
FIG. 14 is an exemplary flowchart showing an operation of an information processing apparatus 10C.
Figure 15:
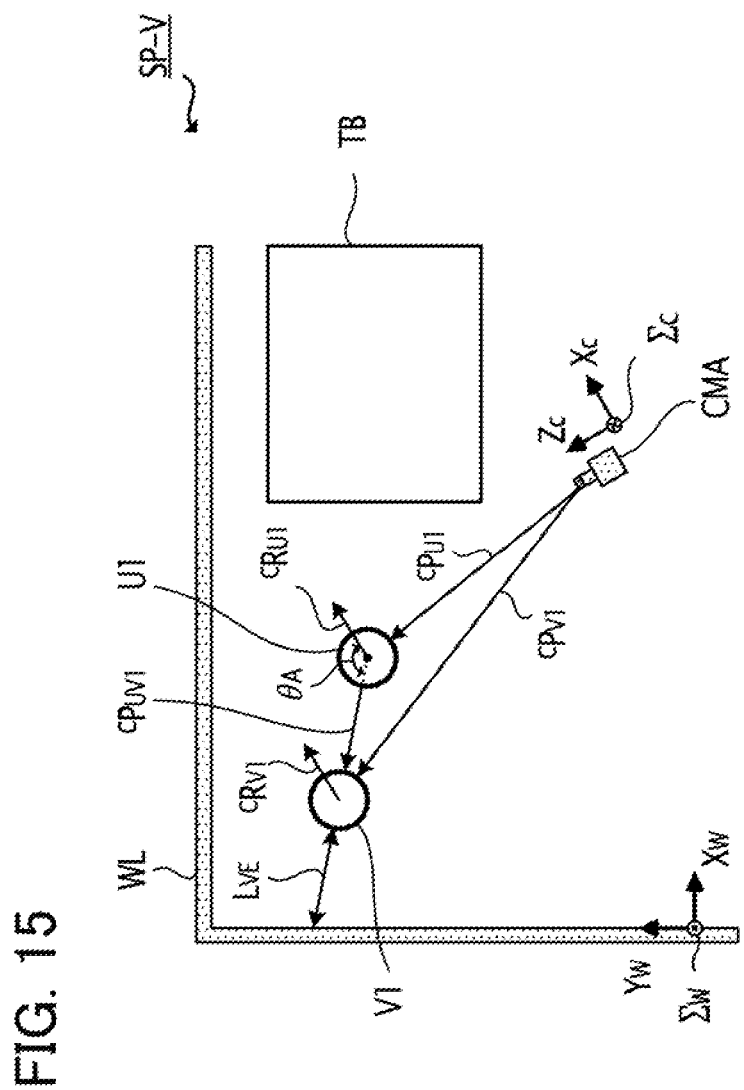
FIG. 15 is an explanatory view showing an example of an outline of a display space SP-V.

Referring to FIGS. 14 and 15, a description will be given with respect to an example of an operation of the information processing apparatus 10C when the information processing apparatus 10C executes a display data generation process for generating display data Dout. FIG. 14 is a flowchart showing an example of the operation of the information processing apparatus 10C when the information processing apparatus 10C executes the display data generation process. In addition, FIG. 15 is an explanatory view illustrating a positional relationship between various objects when the display space SP-V is viewed from the $+Z_{W}$ side.

As shown in FIG. 14, the display data generation process according to the present embodiment is the same process as the display data generation process according to the first embodiment shown in FIG. 6, except that step S102 is not executed, step S400 is executed, and step S402 is executed instead of step S108.

As shown in FIG. 14, when the display data generation process is started, the object identifier 115 identifies the type of the card CDq (S100). Furthermore, the subject position identifier 117 identifies, based on the captured image data DA and the depth-of-field information DS, the position $^{C}P_{Uq}$ of the user Uq in the camera coordinate system $\Sigma_{C}$ shown in FIG. 15 (S104). In addition, the subject position identifier 117 identifies, based on the captured image data DA and the depth-of-field information DS, the orientation $^{C}R_{Uq}$ of the user Uq in the camera coordinate system $\Sigma_{C}$ shown in FIG. 15 (S106). Then, the character position determiner 111C determines, based on the orientation $^{C}R_{Uq}$ of the user Uq in the camera coordinate system $\Sigma_{C}$, a vector $^{C}P_{UVq}$ indicating the position of the character Vq when viewed from the user Uq (S400). Specifically, the character position determiner 111C determines the vector $^{C}P_{UVq}$ at step S400 such that an angle between the orientation $^{C}R_{UVq}$ and the vector $^{C}P_{UVq}$ becomes an angle $\theta_{A}$ as shown in FIG. 15. Furthermore, the character position determiner 111C determines, based on the position $^{C}P_{Uq}$ of the user Uq in the camera coordinate system $\Sigma_{C}$ identified at step S104 and the vector $^{C}P_{UVq}$ determined at step S400, a position $^{C}P_{Vq}$ of the character Vq in the camera coordinate system $\Sigma_{C}$ (S402). Thereafter, the character position determiner 111C determines an orientation $^{C}R_{Vq}$ of the character Vq in the camera coordinate system $\Sigma_{C}$ (S110). Next, the character position determiner 111C adjusts the position $^{C}P_{Vq}$ of the character Vq based on a relative positional relationship between the character Vq and the wall WL in the display space SP-V (S112). Then, the overlap extractor 112 extracts an overlap portion between the user image GUq and the character image GVq (S114). Next, the far-and-near determiner 113 determines which of the user Uq and the character Vq is closer to the camera CMA (S116). Then, the display information generator 114 generates display data Dout indicating the composite image GG (S118). Thereafter, the display information generator 114 determines the end of the display data generation process (S120).

As described above, according to the present embodiment, the position $^{C}P_{Vq}$ of the character Vq in the camera coordinate system $\Sigma_{C}$ is determined based on the identified result of the orientation $^{C}R_{Uq}$ of the user Uq in the camera coordinate system $\Sigma_{C}$. Therefore, according to the present embodiment, the character Vq and the user Uq can be displayed in association with each other regardless of the position or the orientation of the camera CMA and the position or the orientation of the user Uq.

Figure 16:
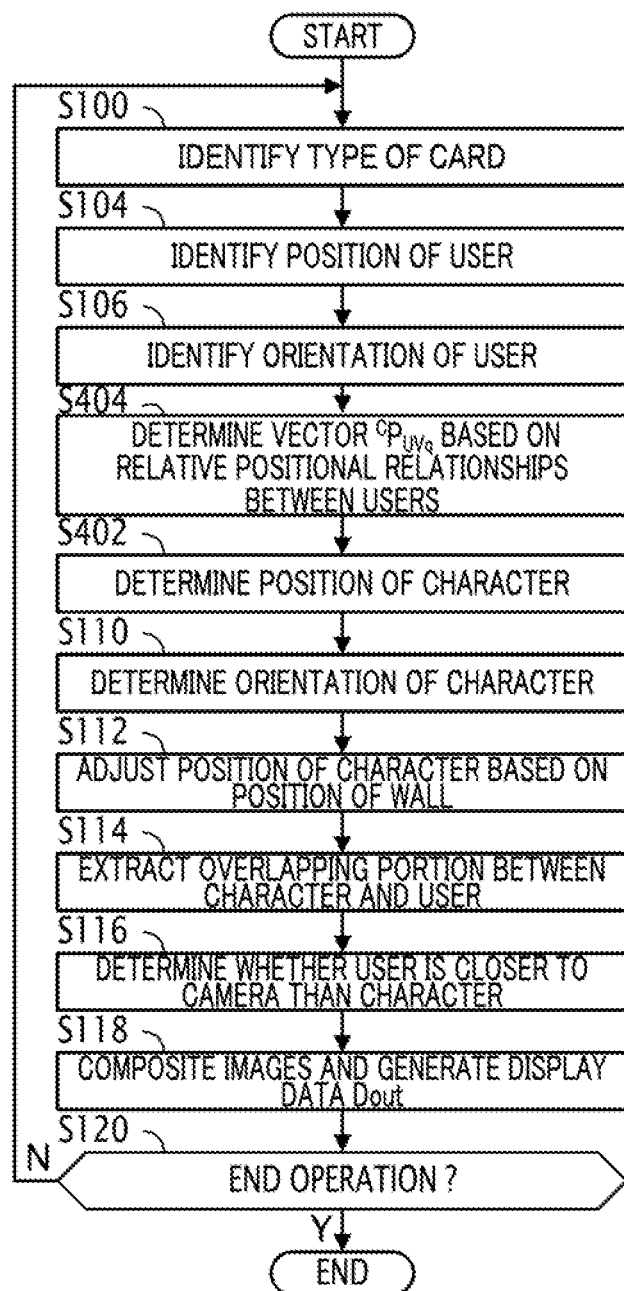
FIG. 16 is an exemplary flowchart showing an operation of the information processing apparatus 10C.
Figure 17:
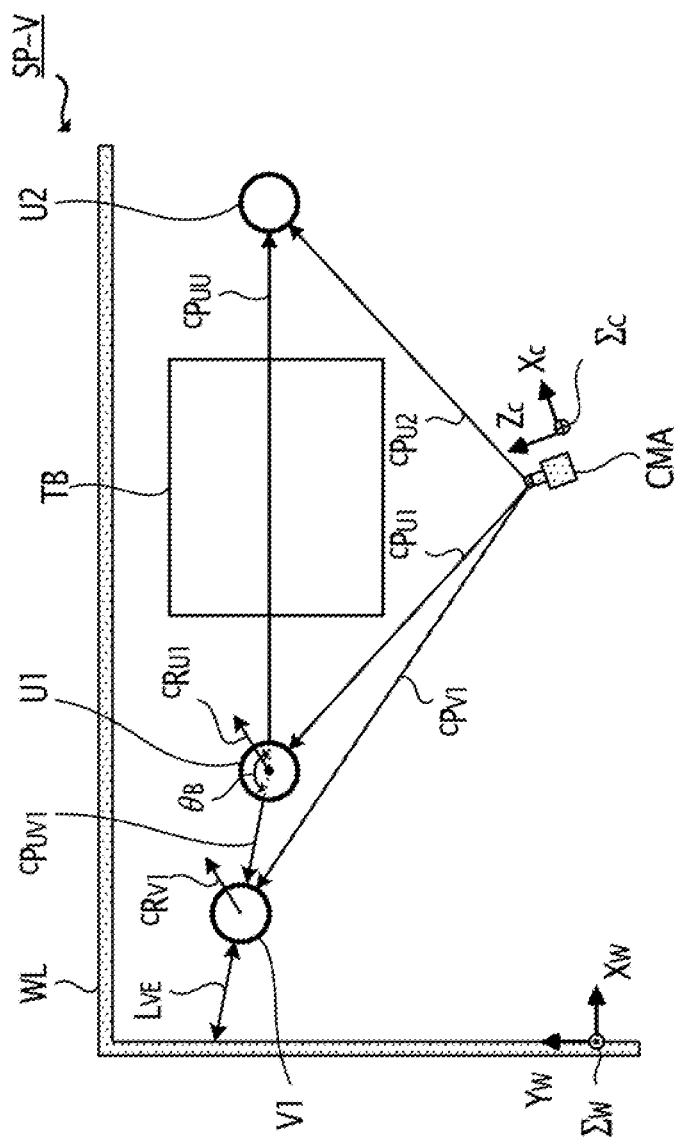
FIG. 17 is an explanatory view showing an example of an outline of a display space SP-V.

In the present embodiment, the character position determiner 111C determines the position $^{C}P_{Vq}$ of the character Vq in the camera coordinate system $\Sigma_C$ based on the identified result of the orientation $^{C}R_{Uq}$ of the user Uq in the camera coordinate system $\Sigma_C$. However, the present invention is not limited to such an aspect. For example, as shown in FIGS. 16 and 17, the position $^{C}P_{Vq}$ of the character Vq in the camera coordinate system $\Sigma_C$ may be determined based on a relative positional relationship between the user U1 and the user U2. FIG. 16 is another exemplary flowchart showing the operation of the information processing apparatus 10C when the information processing apparatus 10C executes the display data generation process. The display data generation process shown in FIG. 16 is the same process as the display data generation process shown in FIG. 14 except that step S404 is executed instead of step S400. In addition, FIG. 17 is an explanatory view illustrating a positional relationship of various objects when the display space SP-V is viewed from the $+Z_W$ side.

As shown in FIG. 16, when the display data generation process is started, the object identifier 115 identifies the type of the card CDq (S100). Furthermore, the subject position identifier 117 identifies, based on the captured image data DA and the depth-of-field information DS, the position $^{C}P_{Uq}$ of the user Uq in the camera coordinate system $\Sigma_C$ shown in FIG. 17 (S104). In the examples shown in FIGS. 16 and 17, the subject position identifier 117 identifies both a position $^{C}P_{U1}$ of the user U1 and a position $^{C}P_{U2}$ of the user U2 in step S104. In addition, the subject position identifier 117 identifies, based on the captured image data DA and the depth-of-field information DS, the orientation $^{C}R_{Uq}$ of the user Uq in the camera coordinate system $\Sigma_C$ shown in FIG. 17 (S106). Then, the character position determiner 111C determines, based on a vector $^{C}P_{UU}$ indicating the relative positional relationship between the user U1 and the user U2 in the camera coordinate system $\Sigma_C$ as shown in FIG. 17, a vector $^{C}P_{UVq}$ indicating the position of the character Vq when viewed from the user Uq (S404). Specifically, in step S404, the character position determiner 111C first calculates a vector $^{C}P_{UU}$ indicating a position of a user U that differs from the user Uq in the camera coordinate system $\Sigma_C$, based on the position $^{C}P_{U1}$ of the user U1 and the position $^{C}P_{U2}$ of the user U2. Next, the character position determiner 111C determines the vector $^{C}P_{UVq}$ such that an angle between the vector $^{C}P_{UU}$ and the vector $^{C}P_{UVq}$ is the same as an angle $\theta_B$. Thereafter, the character position determiner 111C determines the position $^{C}P_{Vq}$ of the character Vq in the camera coordinate system $\Sigma_C$ based on the position $^{C}P_{Uq}$ of the user Uq and the vector $^{C}P_{UVq}$ (S402).

Figure 18:
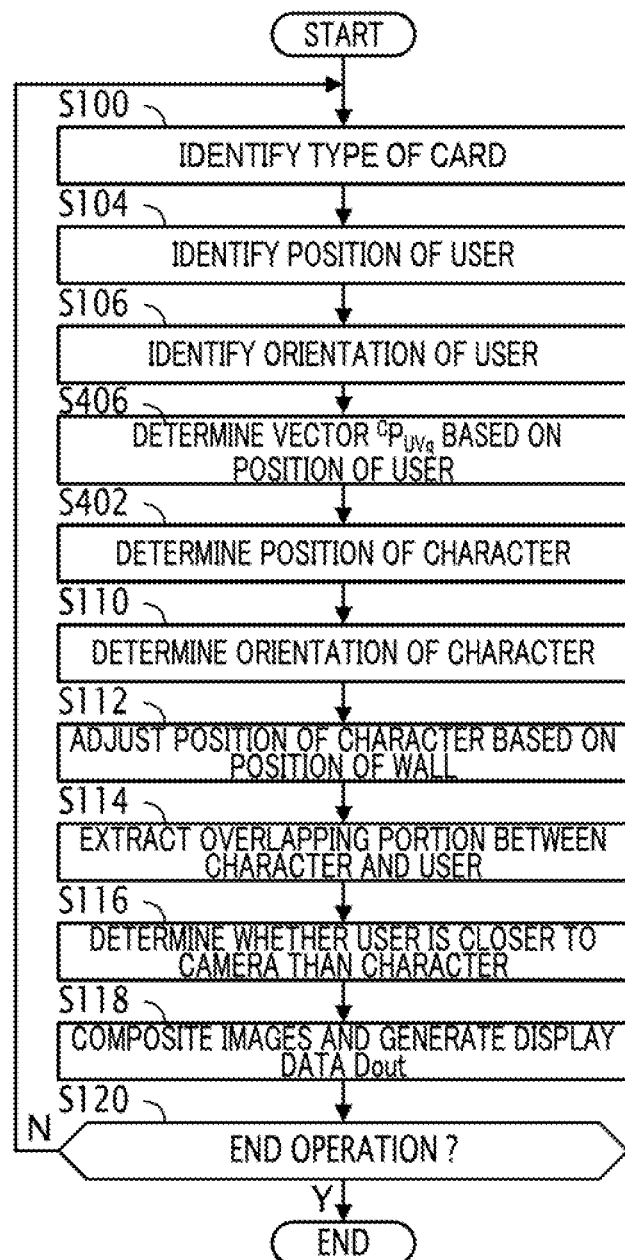
FIG. 18 is an exemplary flowchart showing an operation of the information processing apparatus 10C.
Figure 19:
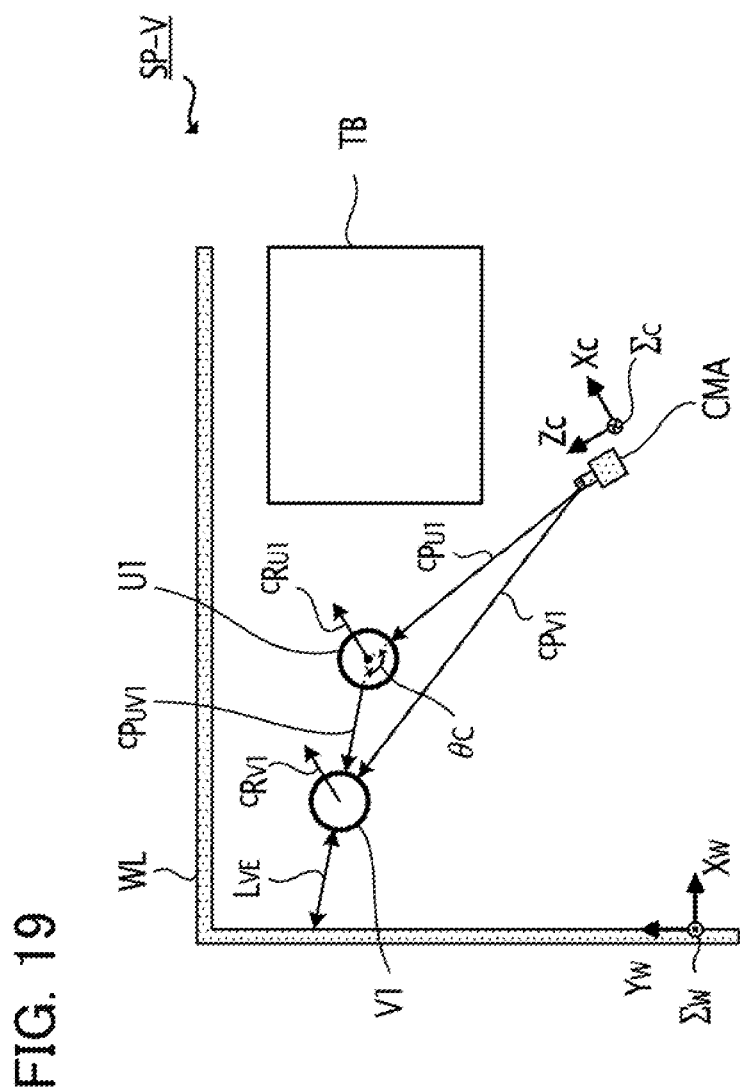
FIG. 19 is an explanatory view showing an example of an outline of a display space SP-V.

As another example, as shown in FIGS. 18 and 19, the position $^{C}P_{Vq}$ of the character Vq in the camera coordinate system $\Sigma_C$ may be determined based on the position of the user Uq. FIG. 18 is a third exemplary flowchart showing the operation of the information processing apparatus 10C when the information processing apparatus 10C executes the display data generation process. The display data generation process shown in FIG. 18 is the same process as the display data generation process shown in FIG. 14, except that step S406 is executed instead of step S400. In addition, FIG. 19 is an explanatory view illustrating a positional relationship between various objects when the display space SP-V is viewed from the $+Z_W$ side.

As shown in FIGS. 18 and 19, the character position determiner 111C determines a vector $^{C}P_{UVq}$ indicating the position of the character Vq when viewed from the user Uq, based on the position $^{C}P_{Uq}$ of the user Uq in the camera coordinate system $\Sigma_C$ (S406). Specifically, in step S406, the character position determiner 111C determines the vector $^{C}P_{UVq}$ such that an angle between the direction indicated by the position $^{C}P_{Uq}$ and the vector $^{C}P_{UVq}$ is the same as an angle $\theta_C$. Thereafter, the character position determiner 111C determines the position $^{C}P_{Vq}$ of the character Vq in the camera coordinate system $\Sigma_C$ based on the position $^{C}P_{Uq}$ of the user Uq and the vector $^{C}P_{UVq}$ (S402).

5. FIFTH EMBODIMENT

A fifth embodiment of the present invention will be described below.

The fifth embodiment differs from the fourth embodiment in that the type of character Vq represented by the character image GVq is designated without using the captured image data DT output from the camera CMT.

Figure 20:
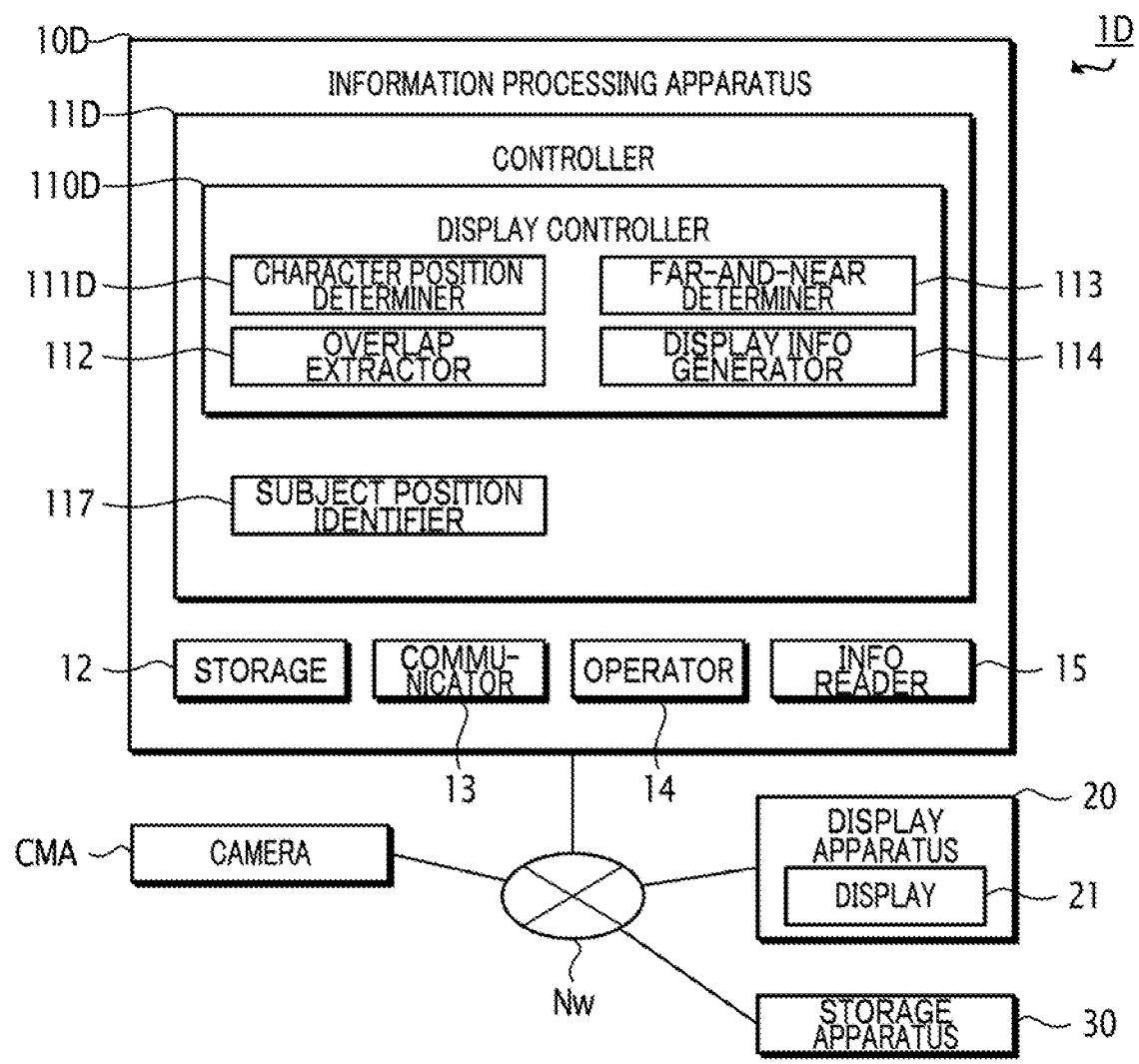
FIG. 20 is an exemplary block diagram showing a configuration of an information processing system 1D according to a fifth embodiment of the present invention.

FIG. 20 is an exemplary functional block diagram showing a configuration of an information processing system 1D according to the fifth embodiment. The information processing system 1D is configured in the same manner as the information processing system 1C according to the fourth embodiment shown in FIG. 13 except for including an information processing apparatus 10D having a controller 11D instead of the information processing apparatus 10C having the controller 11C and not including the camera CMT. The controller 11D is configured in the same manner as the controller 11C according to the fourth embodiment shown in FIG. 14 except for including a display controller 110D having a character position determiner 111D instead of the display controller 110C having the character position determiner 111C and not including the object identifier 115. In the present embodiment, the storage apparatus 30 stores card design information and character information. In the present embodiment, the marker MK may not be provided in the real space SP-R.

Figure 21:
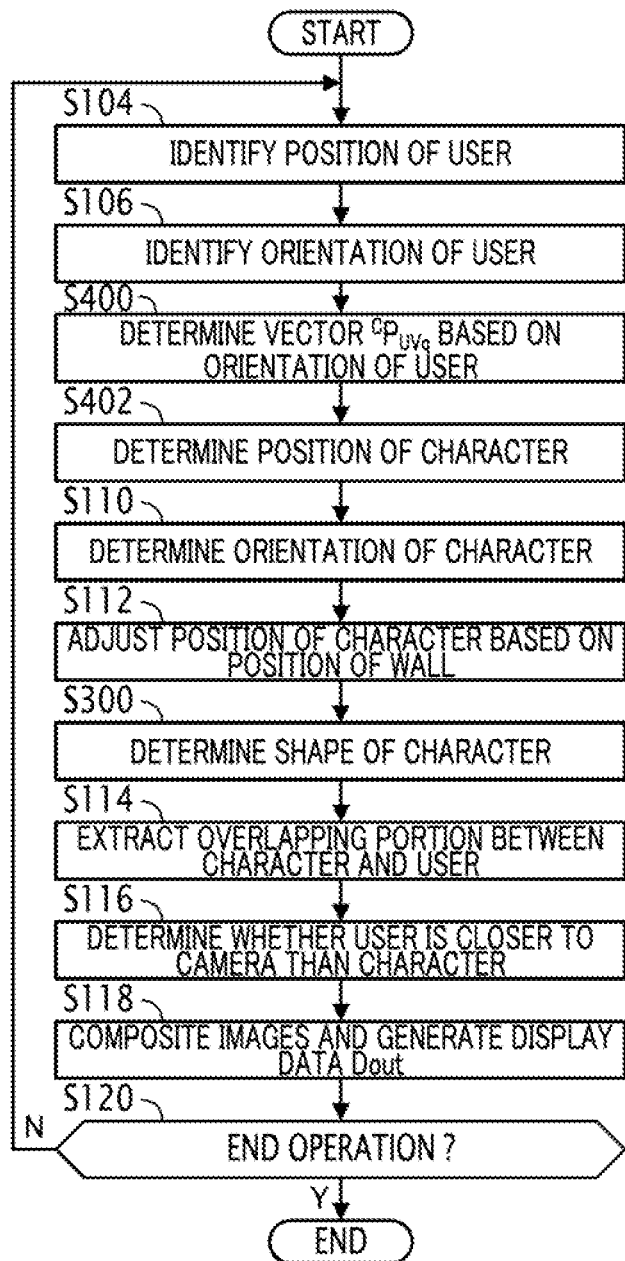
FIG. 21 is an exemplary flowchart showing an example of an operation of the information processing apparatus 10D.

FIG. 21 is a flowchart showing an example of an operation of the information processing apparatus 10D when the information processing apparatus 10D executes a display data generation process of generating display data Dout. As shown in FIG. 21, the display data generation process according to the present embodiment is the same process as the display data generation process according to the fourth embodiment shown in FIG. 14, except that step S100 is not executed and step S300 is executed. In other words, the character position determiner 111D executes steps S400, S402, S110, S112, and S300. However, the character position determiner 111D may execute step S404 or step S406 instead of step S400.

6. MODIFICATIONS

Each of the embodiments described above can be variously modified. Specific modification modes will be described below as examples. Two or more modes, freely selected from the following examples can be appropriately combined within a range, as long as they do not conflict with each other. In the modifications described below, elements with substantially the same operational actions or functions as those in the embodiments are denoted by the same reference signs as in the above description, and detailed description thereof will not be presented, as appropriate.

Modification 1

In the first to fifth embodiments described above, the position $^{W}P_{Vq}$ of the character Vq in the display space SP-V is a fixed position or a position that corresponds to the position $^{W}P_{U_q}$ or the orientation $^{W}R_{U_q}$ of the user Uq. However, the present invention is not limited to these embodiments. The position $^{W}P_{V_q}$ of the character Vq in the display space SP-V may change according to progress of the card game, or may change according to operation of the user Uq.

Figure 22:
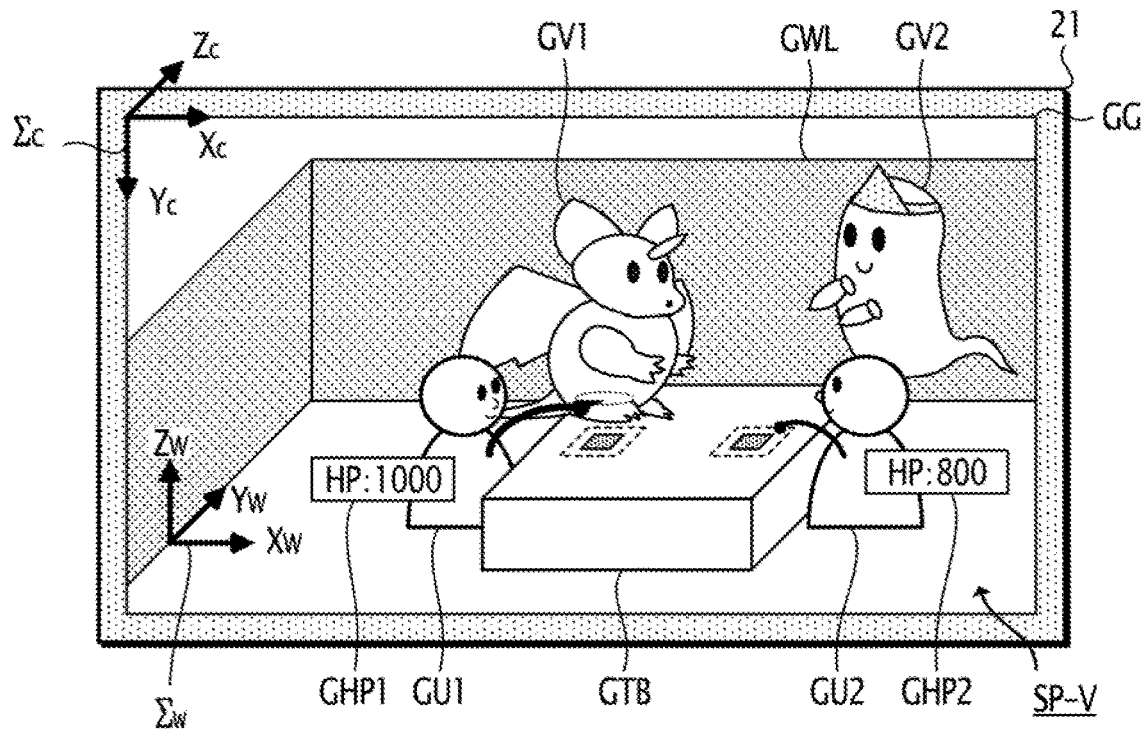
FIG. 22 is an explanatory view showing a composite image GG according to Modification 1 of the present invention.

For example, when the user U1 attacks the card CD2 of the user U2 using the card CD1, when the card CD1 of the user U1 is attacked by the card CD2 of the user U2, or when the user U1 performs a predetermined operation, the character V1 may be moved, in the display space SP-V, from the position behind the user U1 as shown in FIG. 2 to a position in front of the user U1 as shown in FIG. 22. Here, the predetermined operation of the user U1 may be an operation indicating that the user attacks the card CD2 with the card CD1. The operation of the user U1 indicating that the user attacks the card CD2 with the card CD1 may be an operation in which the user U1 points at the card CD2 after pointing at the card CD1, an operation in which the user U1 overlays the card CD1 on the card CD2, or an operation to be performed by the user U1 using the card CD1. In addition, there is a case in which an attack instruction is clear without designation of a card, for example, when a total of only two cards, one owned by the user U1 and the other one owned by the user U2, are placed on the table TB. In such a case, the predetermined operation may be a series of operations in which an operation is performed to indicate a freely chosen location in an area to be set as the opponent's area after an operation is performed to indicate a freely chosen location in an area to be set as one's own area. In other words, when the intention of the user is clear, it is not always necessary to perform an operation of indicating the card. Furthermore, the predetermined operation of the user U1 may be an operation for activating a predetermined effect in the game. Here, the predetermined effect in the game may be an effect of increasing the attack power of the card CD1, an effect of increasing the defense power of the card CD1, or an effect of reducing the attack power of the card CD2. In other words, the predetermined effect in the game may be an effect relating to the progress of the game, such as an effect in which the progress of the game is advantageous to the user U1. The operation of the user U1 for activating the predetermined effect in the game may be an operation in which the user U1 overlays a card other than the card CD1 owned by the user U1 on the card CD1, an operation in which the user U1 overlays the card CD1 on another card, or an operation the user U1 performs using the card CD1. In addition, the predetermined operation of the user U1 may be an operation of changing a role of the card CD1 in the game. Here, the role of the card CD1 in the game may conceptually include one or both of a role that the card CD1 attacks the card CD2, and a role that the card CD1 protects the card CD1 or the user U1 from attack by the card CD2. The operation of the user U1 of changing the role of the card CD1 in the game may be an operation in which the user U1 changes the orientation of the card CD1, or an operation in which the user U1 performs using the card CD1.

Furthermore, the predetermined operation of the user U1 may be an operation of temporarily suspending the game. Here, the operation of the user U1 of temporarily suspending the game may be an operation in which the user U1 turns over the card CD1, or may be an operation in which the user U1 performs using the card CD1. In the above description, an example of the predetermined operation of the user U1 includes the operation the user U1 performs using the card CD1. However the predetermined operation of the user U1 may be an operation the user U1 performs without using the card CD1, or may be an operation to be performed simultaneously with the operation the user U1 performs using the card CD1. Here, the operation the user U1 performs without using the card CD1 and the operation to be performed simultaneously with the operation the user U1 performs using the card CD1 may be an operation in which the user U1 speaks predetermined a words, or an operation in which the user U1 performs a predetermined gesture. In these cases, the operator of the information processing apparatus 10, 10A, 10B, 10C, or 10D (hereinafter, collectively referred to as "information processing apparatus 10 or the like") may use the operator 14 to input information indicating that the user Uq is attacking with the card CDq, or to input information indicating that the user Uq is executing a predetermined operation. Then, the information processing apparatus 10 or the like may recognize that the user Uq is attacking with the card CDq or that the user Uq is executing the predetermined operation, based on the input of the information by the operator of the information processing apparatus 10 or the like. In addition, the information processing apparatus 10 or the like may recognize that user Uq has executed the predetermined operation, based on the captured image data DA and the depth-of-field information DS output from the camera CMA.

The character position determiner 111 of the information processing apparatus 10 may change the position $^{W}P_{V_q}$ of the character Vq in the display space SP-V by changing the size or the orientation of the vector $^{W}P_{UV_q}$ indicated by the relative position information. Furthermore, character position determiner 111A or 111B of the information processing apparatus 10A or 10B may change the position $^{W}P_{V_q}$ of the character Vq in the display space SP-V by changing the position $^{W}P_{V_q}$ of the character Vq indicated by the character position information. The character position determiner 111C or 111C of the information processing apparatus 10C or 10D may change the position $^{W}P_{V_q}$ of the character Vq in the display space SP-V by changing at least one of the size of the angle $\theta_A$, $\theta_B$, or $\theta_C$ and the size of the vector $^{C}P_{UV_q}$.

Modification 2

Figure 23:
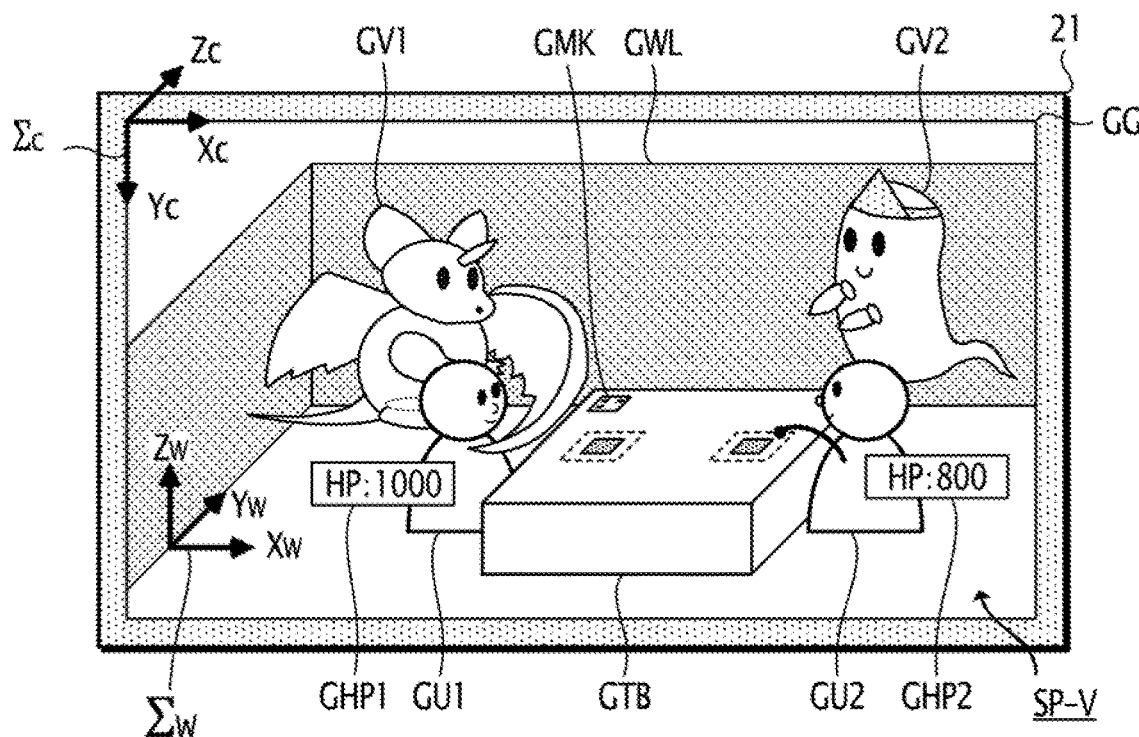
FIG. 23 is an explanatory view showing an example of a composite image GG according to Modification 2 of the present invention.

In the above-described first to fifth embodiments and Modification 1, the character Vq has a fixed shape, but the present invention is not limited to such an aspect, and the shape of the character Vq may be changed. Specifically, the display controller 110, 110A, 110B, 110C, or, 110D (hereinafter, collectively referred to as "display controller 110 or the like") may change the shape of the character Vq according to the progress of the card game or the operation or posture of the user Uq. Here, the shape of the character Vq refers to the posture of the character Vq. For example, the display controller 110 and relative components thereof may change the character V1 from a posture in which wings are not spread, as shown in FIG. 2, to a posture in which wings are spread and protect the user U1, as shown in FIG. 23 when the card CD1 of the user U1 is attacked by the card CD2 of the user U2 or the user U1 performs a predetermined operation. When the character Vq takes the posture in which the wings are spread and protect the user Uq as shown in FIG. 23, the display controller 110 and relative components thereof may cause the user image GUq and the character image GVq to be displayed such that the body of the character Vq hides behind the user Uq when viewed from the camera CMA and a part of the wings of the character Vq is located in front of the user Uq when viewed from the camera CMA. In addition, the display controller 110 and relative components thereof may change the posture of the character V1 to a posture indicating that the character V1 is taking a break when the user U1 executes the operation of temporarily suspending the game.

Modification 3

In the above-described first to fifth embodiments and Modification 1 or 2, the position $^{W}P_C$ and the orientation $^{W}R_C$ of the camera CMA can be changed in the real space SP-R. However the present invention is not limited to such an aspect. The camera CMA may be arranged at a predetermined location in the real space SP-R. In this case, the storage apparatus 30 may store information indicating the position $^{W}P_C$ and the orientation $^{W}R_C$ of the camera CMA in the world coordinate system $\Sigma_W$.

Modification 4

In the above-described first to fifth embodiments and modifications 1 to 3, the information processing system 1, 1A, 1B, 1C, or 1D (hereinafter, collectively referred to as "information processing system 1") includes the storage apparatus 30. However, the present invention is not limited to such an aspect. The information processing system 1 may not include the storage apparatus 30. In this case, the storage 12 included in the information processing apparatus 10 according to these embodiments and modifications may store therein some or all of card design information, character information, marker information, relative position information, user position information, and character position information.

Modification 5

In the above-described first to fifth embodiments and Modifications 1 to 4, the information processing apparatus 10 according to these embodiments and modifications may create a "depth-of-field map" in which values (depth of field) that correspond to the distance between each part of the subject of the camera CMA and the camera CMA are arranged for the entire subject of the camera CMA, based on the depth-of-field information DS. In this case, the information processing apparatus 10 according to these embodiments and modifications may determine which of the character Vq and each part of the subject is closer to the camera CMA, based on the depth-of-field map and the depth of field of the character Vq when viewed from the camera CMA. Then, in this case, when a portion of the character image GVq and a portion of the captured image obtained by capturing the subject overlap with each other in the composite image GG, the information processing apparatus 10 according to these embodiments and modifications does not display, based on the determination result, the image that corresponds to a portion far from the camera CMA between the portion of the character image GVq and the portion of the captured image. Furthermore, the information processing apparatus 10 according to these embodiments and modifications may identify, based on one or both of the captured image data DA and the depth-of-field information DS, the shape and contour of the user Uq or the face position of the user Uq. In this case, the information processing apparatus 10 according to these embodiments and modifications may identify, based on the depth-of-field map, the information and the depth-of-field map indicating the contour of the user Uq, or the face position and the depth-of-field map of the user Uq, a relative positional relationship between the user Uq and the subject other than the user Uq. Then, in this case, the position of the character Vq in the display space SP-V may be determined based on the specified relative positional relationship, and the character image GVq can be displayed based on the determination result and the depth-of-field map.

Modification 6

In the above-described first to fifth embodiments and Modifications 1 to 5, the case in which the game to be played by the user Uq using the "object" such as the card CDq is executed has been described as an example. However the present invention is not limited to such an aspect. The invention of this Application is applicable not only to games, but also to a case in which a user Uq performs an object-use action such as a play or a presentation to be performed using objects.

7. APPENDIXES

From the above description, the present invention can be understood, for example, as follows. In order to clarify each aspect, reference numerals in the drawings are appended below in parentheses for convenience. However the present invention is not limited to the drawings.

Appendix 1

A recording medium according to an aspect of the present invention is a non-transitory computer readable recording medium having recorded therein a program (for example, a control program PRG) executed by a processor (for example, a processor 1000), the program causing the processor to: identify, based on a result of an image captured by a first camera (for example, a camera CMA) configured to capture an image of a user in a real space, a position of the user; display, based on the result of the image captured by the first camera, on a display (for example, a display 21), a first image (for example, a user image GUq) representative of the user, and display, at a position that is based on an identification result obtained by identifying the position of the user, a second image (for example, a character image GVq) that corresponds to an object (for example, a card CDq) in the real space.

According to this aspect, the display displays, at a position that is based on the identified position of the user, the second image that corresponds to the object. For this reason, according to this aspect, the first image representative of the user and the second image that corresponds to the object can be displayed in association with each other. Thus, according to this aspect, when the user captures an image of an object-use action, such as a game, a play, or a presentation to be performed using the object by the user, it is possible to create a sense of reality in the image displayed on the display.

In the above aspect, the concept of "identifying the position of the user" may include at least some of the following: a concept of identifying a coordinate where the user is located in the real space; a concept of identifying a distance between the first camera and the user in the real space; a concept of identifying a depth of the user as viewed from the first camera in the real space; a concept of identifying a direction of the user as viewed from the first camera in the real space; and a concept of identifying an angle between a direction of the camera in the real space of the first camera such as an optical axis direction of the optical system of the first camera that captures a portion and a straight line connecting the first camera and the user.

In this aspect, the "first image" may be an image indicating a part of the entirety of the shape, the contour, the color, and the pattern of the user obtained as a result of the user's image captured by the first camera. Specifically, the "first image" may be an image indicating all of the shape, the contour, the color, and the pattern of the user. In addition, the "first image" may be an image indicating a form of the user, such as the skeleton of the user, or a contour of the user, such as a silhouette of the user. In other words, the "first image" may be an image that does not include at least one of the color and the pattern of the user.

In this mode, the "object" may be an object used by the user for an object-use action such as a game, a play, or a presentation.

Appendix 2

A recording medium according to another aspect of the present invention is one according to appendix 1 or 2, in which the program causes the processor not to display, on the display, in a case in which at least a portion of the first image and at least a portion of the second image overlap with each other, either the at least the portion of the first image or the at least the portion of the second image, based on the identification result.

According to this aspect, when a portion of the first image and a portion of the second image overlap with each other, either the portion of the first image or the portion of the second image is not displayed.

Appendix 3

A recording medium according to another aspect of the present invention is one according to appendix 1 or 2, in which: the second image is an image representative of a character that corresponds to the object, and the program causes the processor to display the second image on the display such that the user represented as the first image and the character represented as the second image have a predetermined positional relationship in a display space to be displayed by the display.

According to this aspect, the first image and the second image are displayed on the display such that the user and the character have the predetermined positional relationship in the display space. For this reason, according to this aspect, it is possible to create a sense of unity between the user and the character in the image to be displayed on the display.

Appendix 4

A recording medium according to another aspect of the present invention is one according to any one of appendixes 1 to 3, in which: the second image is an image representative of a character that corresponds to the object, the program causes the processor to: identify, based on the result of the image captured by the first camera, a position of a background of the user, the background being captured by the first camera, and display, based on the identification result, on the display, a third image representative of the background and the second image.

According to this aspect, the display displays, based on the identified position of the background, the second image that corresponds to the object. For this reason, according to this aspect, it is possible to create an effect in which the character is located in front of the background in the image displayed on the display.

Appendix 5

A recording medium according to another aspect of the present invention is one according to appendix 4, in which the program causes the processor to display the second image on the display such that the character represented as the second image is positioned between the user represented as the first image and the background represented as the third image in a display space to be displayed by the display.

According to this aspect, the display displays the second image such that the character is located in front of the background. For this reason, according to this aspect, it is possible to create a sense of unity between the user and the character in the image to be displayed on the display.

Appendix 6

A recording medium according to another aspect of the present invention is one according to any one of appendixes 1 to 5, in which: the program further causes the processor to identify the type of an object, based on a result of an image captured by a second camera configured to capture an image of the object, and the second image is an image that corresponds to the identified type of the object.

According to this aspect, the display displays the image according to the type of the object used by the user in the object-use action, as the second image. For this reason, according to this aspect, it is possible to create a sense of reality in the image to be displayed on the display, for example, compared with a case in which a single image is displayed as the second image.

Appendix 7

A recording medium according to another aspect of the present invention is one according to any one of appendixes 1 to 6, in which: the second image is an image representative of a character that corresponds to the object, and the program causes the processor to: identify, based on the result of the image of the user captured by the first camera, a posture of the user, and determine, based on the identification result, a posture of the character represented as the second image in a display space to be displayed by the display.

According to this aspect, the posture of the character is determined based on the posture of the user. For this reason, according to this aspect, it is possible to create a sense of unity between the user and the character in the image to be displayed on the display.

Appendix 8

A recording medium according to another aspect of the present invention is one according to appendix 7, in which the program causes the processor to display the second image on the display such that an angle between an orientation of the user represented as the first image and an orientation of the character represented as the second image is equal to or less than a predetermined angle in the display space.

According to this aspect, the second image is displayed on the display such that the orientation of the user is substantially equal to the orientation of the character in the display space, for example. For this reason, according to this aspect, it is possible to create a sense of unity between the user and the character in the image to be displayed on the display.

Appendix 9

A recording medium according to another aspect of the present invention is one according to any one of appendixes 1 to 8, in which: the second image is an image representative of a character that corresponds to the object, and when the user executes a predetermined operation, the program causes the processor to display the second image on a display such that a relative positional relationship between the user represented as the first image and the character represented as the second image changes in a display space to be displayed by the display.

According to this aspect, the relative positional relationship between the user and the character in the display space is changed based on the operation of the user. Therefore, according to this aspect, the relative positional relationship between the user and the character in the display space may be changed according to the progress of the game to be played by the user. For this reason, according to this aspect, it is possible to create a sense of reality in the image to be displayed on the display.

Appendix 10

An information processing apparatus according to one aspect of the present invention includes: a memory storing instructions; and a processor that implements the instructions to: identify, based on a result of an image captured by a first camera configured to capture an image of a user in a real space, a position of the user; display, based on the result of the image captured by the first camera, on a display, a first image representative of the user; and display, at a position that is based on an identification result obtained by identifying the position of the user, a second image that corresponds to an object in the real space.

According to this aspect, the display displays, at a position based on the identified position of the user, the second image that corresponds to the object. For this reason, according to this aspect, the first image representative of the user and the second image that corresponds to the object can be displayed in association with each other. Thus, according to this aspect, when the user captures an image of an object-use action to be performed using the object, it is possible to create a sense of reality in the image displayed on the display.

Appendix 11

An information processing system according to one aspect of the present invention includes: a first camera configured to capture an image of a user in a real space; a display; and an information processing apparatus, in which: the information processing apparatus includes: a memory storing instructions; and a processor that implements the instructions to: identify, based on a result of an image captured by a first camera configured to capture an image of a user in a real space, a position of the user; display, based on the result of the image captured by the first camera, on a display, a first image representative of the user, and display, at a position that is based on an identification result obtained by identifying the position of the user, a second image that corresponds to an object in the real space.

According to this aspect, the display displays, at a position that is based on the identified position of the user, the second image that corresponds to the object. For this reason, according to this aspect, the first image representative of the user and the second image that corresponds to the object can be displayed in association with each other. Thus, according to this aspect, when the user captures an image of an object-use action to be performed using the object, it is possible to create a sense of reality in the image displayed on the display.

Appendix 12

A display method according to one aspect of the present invention includes: identifying, based on a result of an image captured by a first camera configured to capture an image of a user in a real space, a position of the user; displaying, based on the result of the image captured by the first camera, on a display, a first image representative of the user; and displaying, at a position that is based on an identification result obtained by identifying the position of the user, a second image that corresponds to an object in the real space.

According to this aspect, the display displays, at a position based on the identified position of the user, the second image that corresponds to the object. For this reason, according to this aspect, the first image representative of the user and the second image that corresponds to the object can be displayed in association with each other. Thus, according to this aspect, when the user captures an image of an object-use action to be performed using the object, it is possible to create a sense of reality in the image displayed on the display.

DESCRIPTION OF REFERENCE SIGNS 1 information processing system
10 information processing apparatus
11 controller
12 storage
13 communicator
14 operator
15 information reader
20 display apparatus
21 display
30 storage apparatus
110 display controller
111 character position determiner
112 overlap extractor
113 far-and-near determiner
114 display information generator
115 object identifier
116 camera position identifier
117 subject position identifier
1000 processor

What is claimed is:
1. A non-transitory computer readable recording medium having recorded therein a program executed by a processor, the program causing the processor to:
   identify, from an image of a user that is captured by a first camera configured to capture the image of a real space in which a plurality of users and an object are present, a position and a posture of the user, the position of the first camera being different from a position of each of the plurality of users in the real space;
   display, on a display, based on the identified position of the user, a first image representative of the user;

display, on the display, at a position that is based on the identified position of the user, a second image that corresponds to the object in the real space and that represents a character that corresponds to the object, and determine, based on the posture of the user that is identified from the image of the user, a posture of the character represented as the second image in a display space to be displayed by the display.

2. The recording medium according to claim 1, wherein the program causes the processor not to display, on the display, in a case in which at least a portion of the first image and at least a portion of the second image overlap with each other, either the at least the portion of the first image or the at least the portion of the second image, based on the identification result.

3. The recording medium according to claim 1, wherein the program causes the processor to display the second image on the display such that the user represented as the first image and the character represented as the second image have a predetermined positional relationship in the display space to be displayed by the display.

4. The recording medium according to claim 1, wherein the program causes the processor to:
identify, based on the result of the image captured by the first camera, a position of a background of the user, the background being captured by the first camera, and
display, based on the identification result, on the display, a third image representative of the background and the second image.

5. The recording medium according to claim 4, wherein the program causes the processor to display the second image on the display such that the character represented as the second image is positioned between the user represented as the first image and the background represented as the third image in the display space to be displayed by the display.

6. The recording medium according to claim 1, wherein:
the program further causes the processor to identify a type of the object, based on a result of an image captured by a second camera configured to capture an image of the object, and
the second image is an image that corresponds to the identified type of the object.

7. The recording medium according to claim 1, wherein the program causes the processor to display the second image on the display such that an angle between an orientation of the user represented as the first image and an orientation of the character represented as the second image is equal to or less than a predetermined angle in the display space.

8. The recording medium according to claim 1, wherein, when the user executes a predetermined operation, the program causes the processor to display the second image on the display such that a relative positional relationship between the user represented as the first image and the character represented as the second image changes in the display space to be displayed by the display.

9. The recording medium according to claim 1, wherein the posture of the character is changed in response to a change in the posture of the user.

10. An information processing system comprising:
a first camera;
a display; and
an information processing apparatus,
wherein:
the information processing apparatus includes:
a memory for storing instructions; and
a processor that implements the instructions to:
identify, from an image of a user that is captured by the first camera configured to capture an image of a real space in which a plurality of users and an object are present, a position and posture of the user, the position of the first camera being different from a position of each of the plurality of users in the real space;
display, on the display, based on the identified position of the user, a first image representative of the user;
display, on the display, at a position that is based on the identified position of the user, a second image that corresponds to the object in the real space and that represents a character that corresponds to the object; and
determine, based on the posture of the user that is identified from the image of the user, a posture of the character represented as the second image in a display space to be displayed by the display.

11. The information processing system according to claim 10, wherein the posture of the character is changed in response to a change in the posture of the user.

12. A display method comprising:
identifying, from an image of a user that is captured by a first camera configured to capture an image of a real space in which a plurality of user and an object are present, a position and posture of the user, the position of the first camera being different from a position of each of the plurality of user in the real space;
displaying, on a display, based on the identified position of the user, a first image representative of the user; and
displaying, on the display, at a position that is based on the identified position of the user, a second image that corresponds to the object in the real space and that represents a character that corresponds to the object; and
determining, based on the posture of the user that is identified from the image of the user, a posture of the character represented as the second image in a display space to be displayed by the display.

13. The display method according to claim 12, wherein the posture of the character is changed in response to a change in the posture of the user.

* * * * *